US011686125B2

(12) United States Patent
Yamashita et al.

(10) Patent No.: US 11,686,125 B2
(45) Date of Patent: Jun. 27, 2023

(54) SAFETY SWITCH AND SWITCH SYSTEM

(71) Applicant: Panasonic Intellectual Property Management Co., Ltd., Osaka (JP)

(72) Inventors: Isao Yamashita, Hyogo (JP); Yoshiki Furukawa, Shizuoka (JP)

(73) Assignee: PANASONIC INTELLECTUAL PROPERTY MANAGEMENT CO., LTD, Osaka (JP)

( * ) Notice: Subject to any disclaimer, the term of this patent is extended or adjusted under 35 U.S.C. 154(b) by 224 days.

(21) Appl. No.: 17/206,703

(22) Filed: Mar. 19, 2021

(65) Prior Publication Data

US 2021/0332611 A1 Oct. 28, 2021

(30) Foreign Application Priority Data

Apr. 24, 2020 (JP) .............................. JP2020-077800

(51) Int. Cl.
*E05B 47/06* (2006.01)
*E05B 9/02* (2006.01)
(Continued)

(52) U.S. Cl.
CPC ............ *E05B 47/0603* (2013.01); *E05B 9/02* (2013.01); *E05B 41/00* (2013.01); *H01H 9/16* (2013.01)

(58) Field of Classification Search
CPC ...... E05B 47/00; E05B 47/06; E05B 47/0603; E05B 9/00; E05B 9/02; E05B 17/00;
(Continued)

(56) References Cited

U.S. PATENT DOCUMENTS 5,064,328 A * 11/1991 Raker .................... B42C 19/08
227/1
8,902,063 B2 * 12/2014 Auger ..................... H02H 5/10
702/58
(Continued)

FOREIGN PATENT DOCUMENTS

JP 2002-367463 A 12/2002
JP 2019-183542 A 10/2019
(Continued)

OTHER PUBLICATIONS

Extended European Search Report dated Sep. 9, 2021 issued in Patent Application No. 21 16 4239.2.

*Primary Examiner* — Nathan Cumar
(74) *Attorney, Agent, or Firm* — Pearne & Gordon LLP

(57) ABSTRACT

A safety switch includes a processor and a display device. The processor is configured to: set an operation mode of the safety switch; an output unit configured to output a mode notification signal for indicating whether the operation mode of the safety switch is in a maintenance mode; receive an input of a display control signal based upon a system operation mode of a switch system including the safety switch and at least one other safety switch. In response to reception of the input of the display control signal based upon a fact that the system operation mode is in a system maintenance mode indicating that at least one of operation modes of the safety switch and the at least one other safety switch is set to the maintenance mode, the display device displays the indication indicating that the system operation mode is in the system maintenance mode.

12 Claims, 19 Drawing Sheets

(51) Int. Cl.
   *E05B 41/00*   (2006.01)
   *H01H 9/16*   (2006.01)
(58) Field of Classification Search
   CPC . E05B 17/10; H01H 9/00; H01H 9/16; H01H 9/161; H01H 9/162; H01H 2009/164
   USPC .......................................................... 70/330
   See application file for complete search history.

(56) References Cited

U.S. PATENT DOCUMENTS

2015/0137622 A1* 5/2015 Foster .................... H01H 27/06
                                                        307/142
2019/0316381 A1* 10/2019 Oh ............................ F16P 3/08

FOREIGN PATENT DOCUMENTS

| WO | 98/39625 A1 | 9/1998 | |
| WO | WO-9839625 A2 * | 9/1998 | ................ F16P 3/08 |

* cited by examiner

FIG. 11

| CASE | MODE | MASTER | | | SLAVE 1 | | | SLAVE 2 | | | OSSD1 | OSSD2 |
|---|---|---|---|---|---|---|---|---|---|---|---|---|
| | | ACTUATOR | DETECTION | LED | ACTUATOR | DETECTION | LED | ACTUATOR | DETECTION | LED | | |
| 1 | NORMAL | NORMAL | ON | G | NORMAL | ON | G | NORMAL | ON | G | ON | ON |
| 2 | NORMAL | NORMAL | ON | G/F | NORMAL | OFF | R | NORMAL | ON | G/F | OFF | OFF |
| 3 | MAINTENANCE | MAINTENANCE | ON | Y | NORMAL | ON | Y | NORMAL | ON | Y | ON | OFF |
| 4 | MAINTENANCE | MAINTENANCE | ON | Y | NORMAL | ON | Y | NORMAL | OFF | R | ON | OFF |
| 5 | MAINTENANCE | MAINTENANCE | ON | Y | NORMAL | OFF | R | NORMAL | ON | Y | ON | OFF |
| 6 | NORMAL | MAINTENANCE | OFF | R | NORMAL | ON | G/F | NORMAL | ON | G/F | OFF | OFF |
| 7 | MAINTENANCE | MAINTENANCE | ON | Y/R | NORMAL | ON | Y/R | NORMAL | ON | Y/R | OFF | OFF |

| CASE | MODE | MASTER ||| SLAVE 1 ||| SLAVE 2 ||| OSSD1 | OSSD2 |
|---|---|---|---|---|---|---|---|---|---|---|---|---|
| | | ACTUATOR | DETECTION | LED | ACTUATOR | DETECTION | LED | ACTUATOR | DETECTION | LED | | |
| 1 | NORMAL | NORMAL | ON | G | NORMAL | ON | G | NORMAL | ON | G | ON | ON |
| 2 | NORMAL | NORMAL | ON | G/F | NORMAL | OFF | R | NORMAL | ON | G/F | OFF | OFF |
| 3 | MAINTENANCE | NORMAL | ON | Y | MAINTENANCE | ON | Y | NORMAL | ON | Y | OFF | ON |
| 4 | MAINTENANCE | NORMAL | ON | Y | MAINTENANCE | ON | Y | MAINTENANCE | ON | Y | OFF | ON |
| 5 | MAINTENANCE | NORMAL | OFF | R | MAINTENANCE | ON | Y/R | MAINTENANCE | ON | Y/R | OFF | OFF |
| 6 | MAINTENANCE | MAINTENANCE | ON | Y/R | MAINTENANCE | OFF | R | MAINTENANCE | OFF | R | OFF | OFF |
| 7 | NORMAL | NORMAL | ON | G/F | MAINTENANCE | OFF | R | MAINTENANCE | OFF | R | OFF | OFF |
| 8 | MAINTENANCE | NORMAL | ON | Y/R | MAINTENANCE | ON | Y/R | MAINTENANCE | ON | Y/R | OFF | OFF |

T2

SAFETY SWITCH AND SWITCH SYSTEM

CROSS-REFERENCE TO RELATED APPLICATIONS

This application claims the benefit of priority of Japanese Patent Application No. 2020-077800 filed on Apr. 24, 2020, the entire contents of which are incorporated herein by reference.

FIELD

The present disclosure relates to a safety switch and a switch system.

BACKGROUND

In a related art, a safety switch is mounted on a front door of a machine tool and a door portion of a safety fence around a periphery of an industrial robot, and the safety switch detects opening and closing of the door. In the safety switch, a dedicated actuator mounted on the door (a movable side) is inserted into a safety switch body by closing the door, and a contact point inside the body is switched to transmit a signal. As one of the safety switches, there is a safety switch including: a housing that supplies power to a wireless tag provided on an actuator; a wireless circuit for receiving a signal transmitted from the wireless tag; and a plurality of indicator lamps (refer to JP-A-2019-183542). The safety switch turns on and off a large indicator lamp according to an open and closed state of the actuator or the like, and turns on and off a small indicator lamp according to an output signal switching device (OSSD) signal.

Further, there is a power switch malfunction prevention device for an automatic door on which a power switch is mounted (refer to JP-A-2002-367463). The automatic door includes a door body that is slidably erected and a frame body that is disposed on an upper portion of the door body and includes a cover that can be opened and closed on a front surface. A door rail for guiding the door body, a driving unit for driving the door body, and a power switch for turning on and off the power of the driving unit are built in the frame body. The power switch malfunction prevention device includes: a covering member that covers a surface of the power switch; a magnet body that allows the covering member to adhere to the surface of the power switch; a holder that holds the power switch in an off state when the surface of the power switch is covered with the covering member; and a mounting member that detachably mounts an input prohibition tag on the covering member. The power switch malfunction prevention device prevents the power switch from malfunctioning when the cover of the frame body is opened and maintenance and inspection work is performed.

SUMMARY

When maintenance and inspection work (maintenance work) is performed inside a door on which a safety switch of a related art is mounted, there is room for improvement in the safety of an operator performing the maintenance and inspection work.

The present disclosure provides a safety switch and a switch system capable of improving the safety of an operator during maintenance inside a door on which the safety switch is mounted.

The present disclosure provides a safety switch including: a setting unit configured to set an operation mode of the safety switch; an output unit configured to output a mode notification signal for indicating whether the operation mode of the safety switch is in a maintenance mode; an input unit configured to receive an input of a display control signal based upon a system operation mode which is an operation mode of a switch system including the safety switch and at least one other safety switch; and a display unit configured to display an indication based upon the display control signal, wherein in response to reception of the input of the display control signal which is based upon a fact that the system operation mode is in a system maintenance mode indicating that at least one of operation modes of the safety switch and the at least one other safety switch is set to the maintenance mode, the display unit displays the indication indicating that the system operation mode is in the system maintenance mode.

The present disclosure provides a switch system including a plurality of the safety switches including a first safety switch and a second safety switch, wherein each of the plurality of the safety switches includes the above-described safety switch, wherein the output unit of the second safety switch is configured to output the mode notification signal to the first safety switch, and wherein the first safety switch is configured to set the system operation mode based upon the operation mode set by the setting unit of the first safety switch and the mode notification signal from the second safety switch, and output the display control signal based upon the system operation mode to the second safety switch.

According to the present disclosure, it is possible to improve the safety of an operator during maintenance inside a door on which a safety switch is mounted.

BRIEF DESCRIPTION OF DRAWINGS

FIG. 11 is a diagram illustrating a detailed display example of each safety switch when a system operation mode can be set to the overall maintenance mode;

FIG. 16 is a diagram illustrating a detailed display example of each safety switch when the system operation mode can be set to the individual maintenance mode;

DETAILED DESCRIPTION

Hereinafter, embodiments will be described in detail with reference to the appropriate drawings. However, a detailed description more than necessary may be omitted. For example, a detailed description of an already well-known matter and a duplicate description of substantially the same configuration may be omitted. It is to avoid unnecessary redundancy of the following description and to facilitate the understanding of those skilled in the art. The accompanying drawings and the following descriptions are provided for those skilled in the art to fully understand the present disclosure, and are not intended to limit the subject matter described in the scope of the claims.

Introduction to Contents of Embodiments

In a switch system including a plurality of safety switches installed on a door or the like, when the safety switch detects that the door is open, a device (an internal device) such as a machine tool or the like disposed inside the door stops an operation thereof. The internal device may be maintained on a regular or irregular basis. During the maintenance, the door is open, and an operator enters inside the door through the door to perform maintenance work on the internal device.

A switch system of a related art includes a plurality of safety switches, a safety PLC, and a mode changeover switch. The safety switch detects opening and closing of a door. The safety PLC controls an operation of an internal device. The mode changeover switch switches an operation mode of the switch system. The operation mode includes a maintenance mode in which an operator enters inside the door through the door and performs maintenance, and a normal mode other than the maintenance mode.

In the normal mode, the safety PLC controls driving of the internal device according to an output (a detection result) of the safety switch. Here, when the safety switch detects that the door is open, the safety PLC stops the driving of the internal device. On the other hand, in the maintenance mode, the safety PLC disables the output of the safety switch. Here, even though the safety switch detects that the door is open, the safety PLC does not stop the driving of the internal device.

For example, it is assumed that an operator enters inside a door through one of the doors and performs maintenance on the internal device. Here, when another operator enters inside the door through another door, it is difficult to recognize whether maintenance work is in progress at another location.

Figure 22:
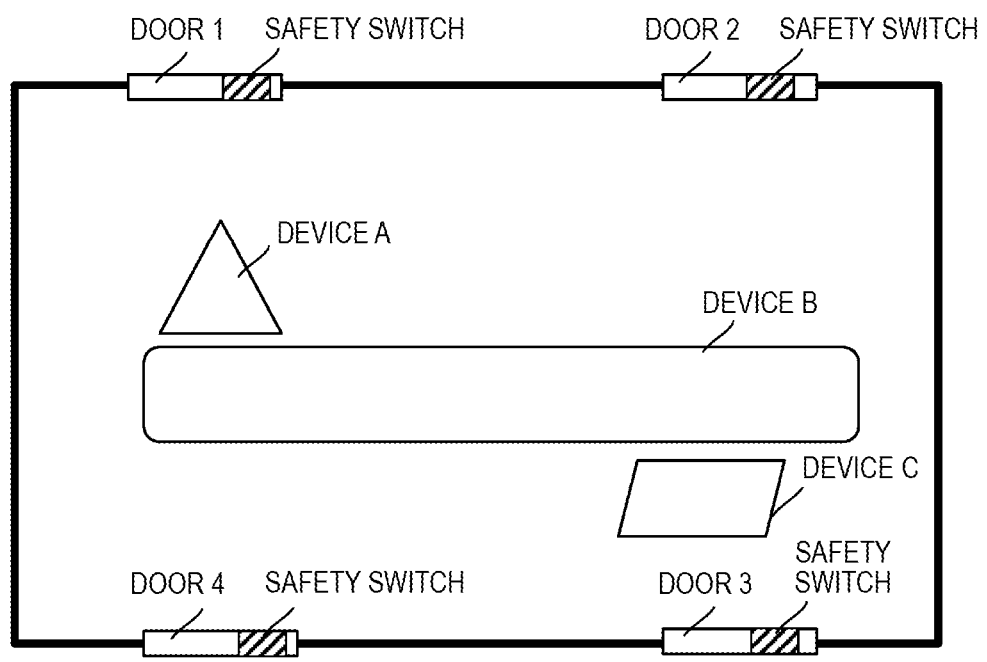
FIG. 22 is a diagram illustrating maintenance work performed by an operator of a related art.

FIG. 22 is a diagram illustrating maintenance work by an operator of a related art. For example, an operator P1 switches to the maintenance mode by using the mode changeover switch, stops an operation of each of the devices A to C, enters inside a door through a door 1, and performs maintenance work on the device A. The door 1 cannot be visually recognized from the outside of a door in the vicinity of a door 3 and a door 4. From the inside of the door in the vicinity of the doors 3 and the door 4, a view toward the device A is blocked by the device B, such that a state of the device A cannot be visually recognized therefrom. Therefore, another operator P2 located in the vicinity of the door 4 cannot recognize that the operator P1 is performing the maintenance work on the device A. Therefore, entering inside the door may cause the operator P2 to be in danger. For example, when the operation of the device B is stopped, the operator P2 may determine that the device B that should be originally operated is stopped and may operate the device B. Here, the operation mode is set to the maintenance mode, and the safety PLC does not stop driving of the device B. Accordingly, there is a possibility that the operator P1 is in danger due to the sudden operation of the device B.

In the following embodiments, it is possible to improve the safety of an operator during maintenance inside a door on which a safety switch is mounted. The safety switch and the switch system will be described.

Embodiment

Figure 1:
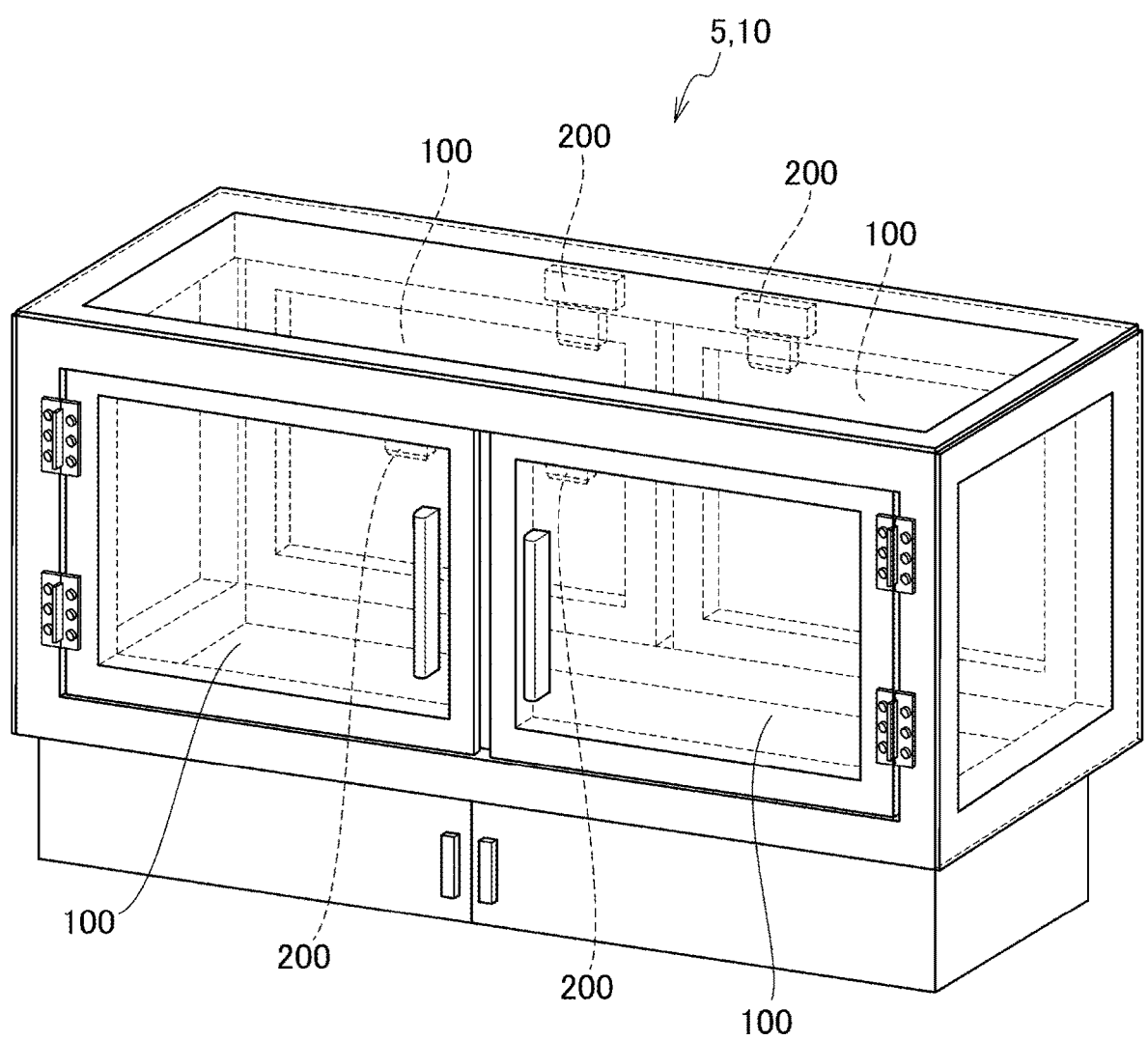
FIG. 1 is a diagram illustrating a configuration example of a device with a door according to an embodiment.

FIG. 1 is a diagram illustrating a configuration example of a device with a door 10 according to the embodiment. The device with the door 10 includes one or more doors 100 and one or more safety switches 200. The door 100 may broadly include a door-related object such as a door or the like, and may include a window. One or more devices (for example, a manufacturing device and other devices) are housed inside the device with the door 10. The device disposed inside the device with the door 10 is also referred to as an "internal device".

A switch system 5 may be formed by including a plurality of safety switches 200. The switch system 5 forms one group with the plurality of safety switches 200. The respective safety switches 200 provided in the switch system 5 may be connected to each other in order, or may be connected to each other in series. The respective safety switches 200 may be connected to one specific safety switch 200 (for example, a master switch which will be described later) on a one-to-one basis. At least one safety switch 200 is connected to the safety PLC. The safety switch 200 of the embodiment may be basically provided in the switch system 5.

Figure 2:
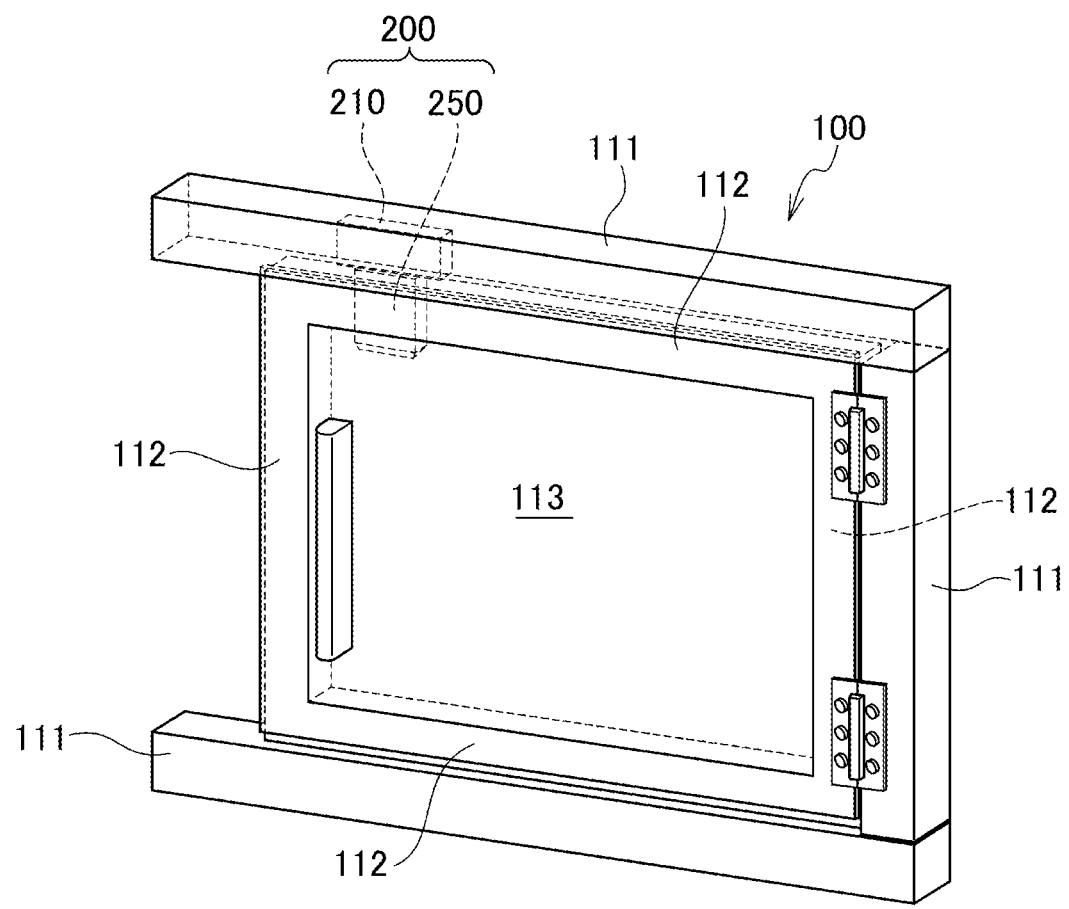
FIG. 2 is a perspective view illustrating a configuration example of the door.

FIG. 2 is a perspective view illustrating a configuration example of the door 100. The door 100 includes a fixed frame 111, a movable frame 112, and a door body 113, respectively.

The fixed frame 111 may be a part of a member that covers an outer periphery of the device with the door 10. The fixed frame 111 is, for example, an aluminum frame, and may be a frame made of another material. The fixed frame 111 does not have translucency.

The movable frame 112 is freely movable with respect to the fixed frame 111. As a result, the door 100 can be freely opened and closed. The movable frame 112 is, for example, an aluminum frame, and may be a frame made of another material. The movable frame 112 does not have translucency.

A periphery of the door body 113 is surrounded by the movable frame 112. For example, the door body 113 is formed of a translucent member. The translucent member may be formed of, for example, transparent plastic and glass, and the same also applies to a subsequent description of the translucent member.

An opening and closing system of the door 100 may include a hinged door system, a sliding door system, a folding door system, a bellows system, a double door system, a gull wing system, or the like.

The safety switch 200 functions as a door sensor for detecting opening and closing of the door 100. The safety switch 200 can detect the opening and closing of the door 100 (an own door) on which the safety switch 200 is mounted, and can also detect opening and closing of the door 100 (another door) other than the door on which the safety switch 200 is mounted. The safety switch 200 may have an interlock function, an external device monitoring (EDM) function, or the like.

The safety switch 200 includes a sensor body 210 and an actuator 250. The sensor body 210 is installed on the fixed frame 111 inside the device with the door 10. The actuator 250 is installed on the movable frame 112 inside the device with the door 10. Accordingly, when viewed from a confirmer who performs confirmation from the outside of the device with the door 10, the safety switch 200 is located on a back side of the fixed frame 111 and the movable frame 112. The confirmer can confirm a display of the safety switch 200 through the door body 113 which is formed of the translucent member.

A plurality of safety switches 200 can be connected to each other by any connection method. For example, a plurality of safety switches 200 can be connected to each other in series and cascade-connected to each other. Here, the order (a position) of series connection may be described by a stage. For example, the first safety switch 200 of the series connection may be defined as the safety switch 200 at a first front stage, and the last safety switch 200 of the series connection may be defined as the safety switch 200 at a last rear stage. The safety switch 200 at the last rear stage is connected to the safety programmable logic controller (PLC).

Figure 3:
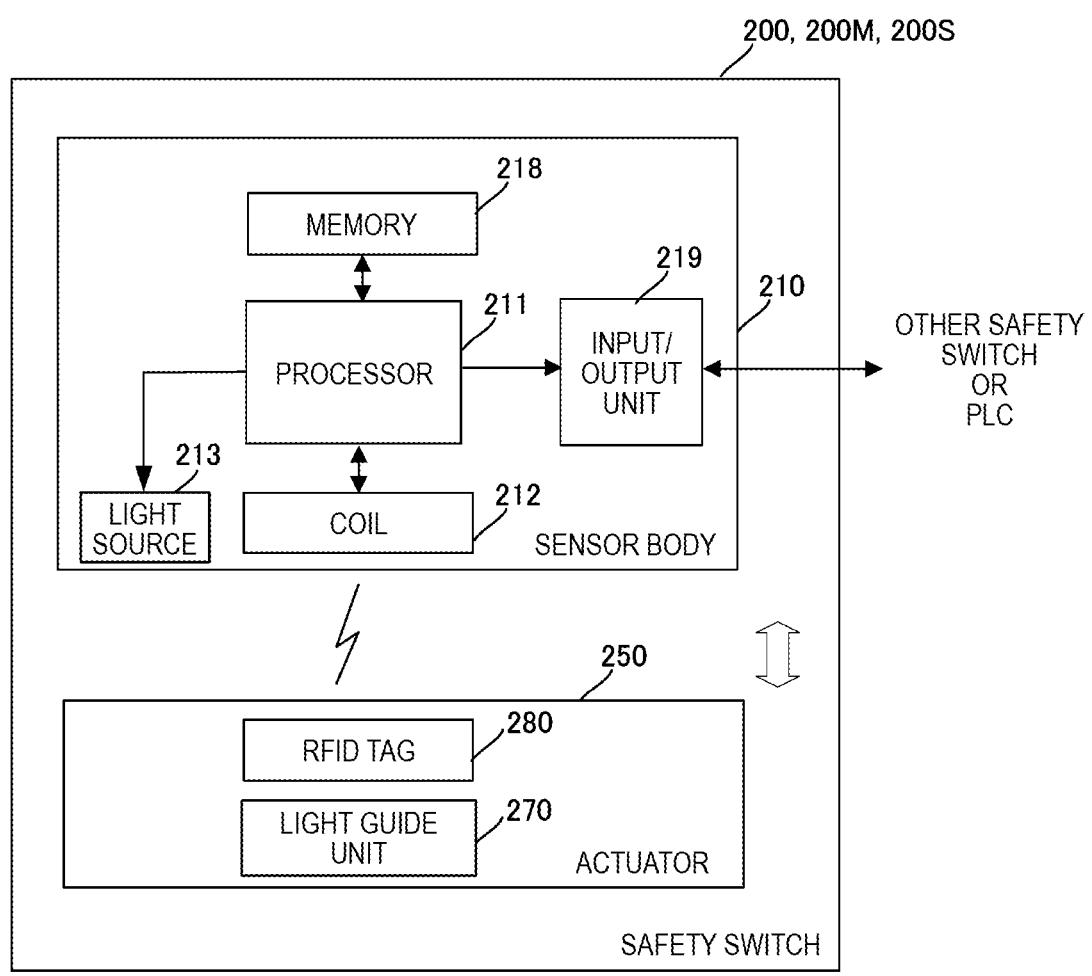
FIG. 3 is a block diagram illustrating a configuration example of a safety switch.

FIG. 3 is a block diagram illustrating a configuration example of the safety switch 200. The safety switch 200 includes the sensor body 210 and the actuator 250. The sensor body 210 includes a processor 211, a coil 212, a light source 213, a memory 218, and an input/output unit 219. The actuator 250 includes a light guide unit 270 and a radio frequency identifier (RFID) tag 280. The actuators 250 include two types such as a maintenance actuator 250*m* and a normal actuator 250*n*.

The processor 211 realizes various functions by cooperating with the memory 218 and executing a program stored in the memory 218. The processor 211 may include a micro processing unit (MPU), a central processing unit (CPU), a digital signal processor (DSP), or the like. The processor 211 controls an overall operation of the sensor body 210.

The processor 211 detects whether the own door is closed (in a closed state) or open (in an open state) based upon a state of proximity between the coil 212 of the sensor body 210 and the RFID tag 280 of the actuator 250.

The processor 211 sets any operation mode among a plurality of operation modes of the safety switch 200. The operation mode includes a maintenance mode in which an operator performs maintenance and a normal mode other than the maintenance mode. The operation mode of the safety switch 200 may be set to other operation modes.

The coil 212 receives power from the outside via the input/output unit 219, and transmits the power to an external device (for example, the actuator 250) by wireless power transmission. The wireless power transmission may be an electromagnetic induction method or a magnetic field resonance method. When the coil 212 receives a predetermined signal from the external device, the coil 212 notifies the processor 211 that the predetermined signal is received. The external device is, for example, the actuator 250, and more specifically the RFID tag 280 of the actuator 250. The coil 212 detects a closed state (an example of no abnormality) by receiving the predetermined signal from the actuator 250, and detects an open state (an example of abnormality) by not receiving the predetermined signal therefrom.

There may be one light source or a plurality of light sources 213. The light source 213 emits (displays) light under the control of the processor 211. The light source 213 may project light to the actuator 250 via a light projecting port 214 which is not illustrated of the sensor body 210 facing the actuator 250. The actuator 250 may receive the emitted light, may guide the light from the sensor body 210 via, for example, the light guide unit 270 formed of a translucent member, and may emit visible light. The light source 213 may directly emit light to the outside of the safety switch 200 without projecting the light to the actuator 250. In any case, the present invention is not limited thereto as long as the light emitted by the safety switch 200 can be confirmed from the outside of the device with the door 10 through the door body 113 formed of the translucent member.

The light source 213 may be displayed based upon a system operation mode which is an operation mode of the switch system 5 which will be described later. The light source 213 may be displayed based upon a detection result of presence or absence of abnormality of the door 100 (the own door) by the safety switch 200 (an own switch). The light source 213 may be displayed based upon a detection result of presence or absence of abnormality of another door 100 (another door) by another safety switch 200 (another switch) different from the above-described safety switch 200. The presence or absence of the abnormality of the door 100 may include the open and closed state of the door 100. The detection result of the presence or absence of the abnormality detected by the safety switch 200 is also simply referred to as a "detection result". The light source 213 can be displayed in various display modes. The display mode may be a display color, a display pattern (for example, lighting, flashing, turning off light), light intensity, or the like.

The memory 218 includes a primary storage device (for example, a random access memory (RAM) and a read only memory (ROM). The memory 218 may include another storage device (for example, an SD card). The memory 218 stores various data, information, programs, or the like.

The memory 218 stores, for example, identification information of the actuator 250 (for example, an ID of the RFID tag 280). In this case, the memory 218 only stores the ID of the RFID tag 280 of the maintenance actuator 250m, and may not store the ID of the RFID tag 280 of the normal actuator 250n.

The input/output unit 219 inputs and outputs data, information, and a signal to and from an external device (for example, another switch, safety PLC). Various signal lines are connected to the input/output unit 219. The input/output unit 219 inputs and outputs (at least one of input and output) a signal such as a power signal, an abnormality detection signal, a mode notification signal, a display control signal, or the like via the signal line. The input/output unit 219 may include various signal lines.

The power signal includes power to be supplied to various electrical components provided in the safety switch 200. The abnormality detection signal indicates a detection result of presence or absence of abnormality (for example, the open and closed state of another door) of other switches connected to a stage prior to that of the own switch. When the presence of the abnormality is detected in at least one of other switches connected to the stage prior to that of the own switch, the abnormality detection signal indicates the presence of the abnormality.

The mode notification signal indicates an operation mode set by other switches connected to the stage prior to that of the own switch. When the maintenance mode is set to at least one of other switches connected to the stage prior to that of the own switch, the mode notification signal indicates that the maintenance mode is set. The display control signal is a signal for controlling a display by the light source 213.

The display control signal is performed based upon the system operation mode. For example, when at least one of the safety switches 200 provided in the switch system 5 is set to the maintenance mode, the system operation mode becomes a system maintenance mode. For example, when all the safety switches 200 provided in the switch system 5 are set to the maintenance mode, the system operation mode becomes a system normal mode. The display control signal may be performed based upon the system operation mode and the detection result of the presence or absence of the abnormality by the own switch and other switches.

The RFID tag 280 of the actuator 250 is located within a communicable range with the coil 212 of the sensor body 210 when the door 100 is in the closed state. For example, the RFID tag 280 is disposed on a facing surface side facing the sensor body 210 in the actuator 250, when the door 100 is in the closed state. The RFID tag 280 transmits a predetermined signal. The RFID tag 280 is, for example, a passive tag, and operates by receiving power supply from the outside (for example, the sensor body 210). For example, the RFID tag 280 receives the power supply from the sensor body 210 via the coil 212 and transmits the predetermined signal to the sensor body 210. The predetermined signal may include at least information that identifies the RFID tag 280 (the ID of the RFID tag 280).

Here, a specific method for setting the operation mode of the safety switch 200 and a specific method for detecting the opening and closing by the safety switch 200 will be described.

The sensor body 210 detects the actuator 250 when the actuator 250 is disposed at a predetermined position with respect to the sensor body 210. Specifically, when the RFID tag 280 of the actuator 250 is positioned within an area where wireless power transmission from the coil 212 of the sensor body 210 can be performed, the sensor body 210 supplies power to the actuator 250, and the actuator 250 transmits a predetermined signal (a signal including the ID of the RFID tag 280) to the sensor body 210. When the coil 212 detects that the predetermined signal is received from the actuator 250, the coil 212 notifies the processor 211 of the ID of the RFID tag 280. By receiving the notification, the processor 211 recognizes the actuator 250.

When the ID of one or more RFID tags 280 stored in the memory 218 includes the ID of the RFID tag 280 indicated by a notification from the coil 212, the processor 211 recognizes that the maintenance actuator 250m is detected. Here, the processor 211 sets the operation mode of the safety switch 200 to the maintenance mode.

When the ID of one or more RFID tags 280 stored in the memory 218 does not include the ID of the RFID tag 280 indicated by a notification from the coil 212, the processor 211 recognizes that the normal actuator 250n is detected. Here, the processor 211 sets the operation mode of the safety switch 200 to the normal mode.

As a result, the safety switch 200 can set the operation mode of the safety switch 200 without being provided with the mode changeover switch for setting the operation mode of the safety switch 200 and without performing an operation of the mode changeover switch.

When the sensor body 210 detects the actuator 250 (the maintenance actuator 250m or the normal actuator 250n), the processor 211 detects the actuator 250 (the maintenance actuator 250m or the normal actuator 250n), the processor 211 determines that the movable frame 112 on which the actuator 250 is installed faces the fixed frame 111 on which the sensor body 210 is installed in a predetermined state, and the door 100 is in the closed state. When the sensor body 210 does not detect the actuator 250 (the maintenance actuator 250m or the normal actuator 250n), the processor 211 determines that the movable frame 112 on which the actuator 250 is installed does not face the fixed frame 111 on which the sensor body 210 is installed in the predetermined state, and the door 100 is in the open state.

Next, the internal device and the safety PLC will be described.

The device (the internal device) inside the device with the door 10 is, for example, a manufacturing device for manufacturing various products (for example, electrical, mechanical, and chemical substances) and a device for assisting the manufacturing. The internal device or the product is any device or any product, and is, for example, an internal device or a product that should be handled with care. An operation of the internal device is controlled by the safety PLC.

The safety PLC is an example of a control device that controls the operation of the internal device. The safety PLC is connected between the safety switch 200 and the internal device. Although not particularly illustrated herein, the safety PLC includes a processor, a memory, an input/output unit, or the like. The processor cooperates with the memory provided in the safety PLC, thereby realizing various functions. The processor may include an MPU, a CPU, a DSP, or the like. The processor controls an overall operation of the safety PLC. The input/output unit inputs and outputs data, information, and a signal to and from an external device (for example, the safety switch 200 and the internal device). Various signal lines are connected to the input/output unit. The input/output unit can input and output (at least one of input and output) a signal such as, for example, a power signal, an abnormality detection signal, a mode notification signal, a display control signal, a PLC control signal for controlling the safety PLC, a device control signal for controlling the internal device, or the like via the signal line. The safety PLC may be provided in the switch system 5.

For example, the safety PLC may acquire the PLC control signal from at least one safety switch 200 and may instruct control of the operation of the internal device based upon the PLC control signal. The PLC control signal may be determined based upon the system operation mode. The PLC control signal is determined based upon the system operation mode and the detection result of abnormality of each safety switch 200 provided in the switch system 5.

For example, the safety PLC may instruct the control of the operation of the internal device based upon the system operation mode. For example, when the system operation mode is in the system maintenance mode, the safety PLC may allow the internal device to perform an operation for the system maintenance mode (for example, some operations are restricted and an operation speed is slowed down). As a result, the safety PLC can perform an operation different from a normal operation such as the system normal mode in the system maintenance mode, such that the safety of an operator can be considered.

The safety PLC may instruct the control of the operation of the internal device according to the system operation mode and a state of the safety switch 200. For example, when the system operation mode is in the system normal mode and the safety switch 200 detects that all the doors 100 are in the closed state, the safety PLC may be able to operate the internal device. For example, when the system operation mode is in the system normal mode and the safety switch 200 detects that at least one door 100 is in the open state, the safety PLC may stop the operation of the internal device. As a result, the safety PLC can operate or stop the internal device in consideration of the safety of the operator in the system normal mode.

In FIG. 1, a plurality of doors 100 are provided to surround the internal device, and the device with the door 10 is formed in a rectangular shape in a plan view, and the present invention is not limited thereto. For example, the plurality of doors 100 may be disposed in one direction. Here, the plurality of doors 100 may be disposed linearly in a direction parallel to a surface of the door body 113, or may be disposed linearly in a direction perpendicular to a surface of the door 100.

Next, classification of the safety switch 200 will be described.

A plurality of safety switches 200 are provided and are classified into a master switch 200M and a slave switch 200S. The master switch 200M is disposed at the last rear stage among the plurality of safety switches 200, and is disposed immediately before a stage of a safety PLC 400. The slave switch 200S is a safety switch other than the master switch 200M among the plurality of safety switches 200, and is a safety switch adjacent to other safety switches 200, but not adjacent to the safety PLC.

The processor 211 of the master switch 200M sets the system operation mode, which is the operation mode of the switch system 5, to any system operation mode. The system operation mode includes the system maintenance mode in which an operator performs maintenance and the system normal mode other than the system maintenance mode. The system operation mode may be able to be set to other system operation modes.

Figure 4:
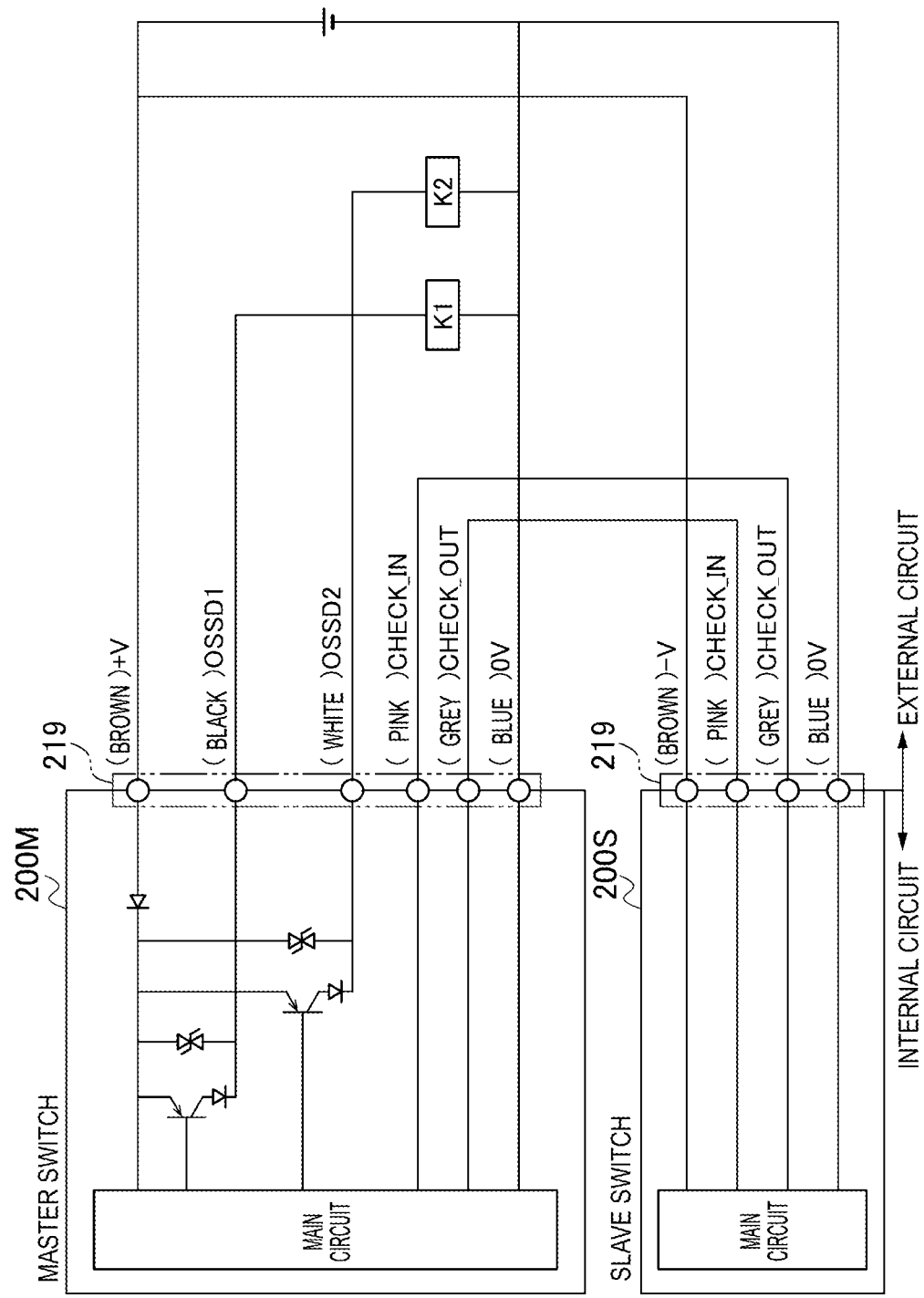
FIG. 4 is a diagram illustrating an example of each signal line connected to an input/output unit of the safety switch.

FIG. 4 is a diagram illustrating an example of each signal line connected to the input/output unit 219 of the safety switch 200. FIG. 4 illustrates an example in which the master switch 200M and the slave switch 200S are connected to each other.

A power signal line (+V and 0V), an OSSD signal line (OSSD1 and OSSD2), a check signal line (CHECK_IN and CHECK_OUT), or the like are connected to the input/output unit 219 of the master switch 200M. The power signal line transmits a power signal. The check signal line transmits at least one of the mode notification signal, the abnormality detection signal, and the display control signal between the master switch 200M and the slave switch 200S. The CHECK_IN is a signal line for input, and the CHECK_OUT is a signal line for output.

The OSSD signal line transmits the PLC control signal from the master switch 200M to the safety PLC 400. The OSSD signal lines are duplexed. The OSSD1 and OSSD2 transmit the same signal in the normal mode, and transmit a basically different signal in the maintenance mode. For example, when it is detected that all the safety switches 200 provided in the switch system 5 are in the closed state in the system normal mode, an ON signal is transmitted to both the OSSD1 and OSSD2. For example, when it is detected that at least one safety switch 200 provided in the switch system 5 is in the open state in the system normal mode, an OFF signal is transmitted to both the OSSD1 and OSSD2. For example, in the maintenance mode, the OSSD1 may transmit the ON signal and the OSSD2 may transmit the OFF signal, or the OSSD1 may transmit the OFF signal and the OSSD2 may transmit the ON signal. As a result, the safety PLC can recognize that the switch system 5 is in operation in the maintenance mode by acquiring the signals transmitted by the OSSD1 and the OSSD2.

A power signal line (−V and 0V), a check signal line (CHECK_IN and CHECK_OUT), or the like are connected to the input/output unit 219 of the slave switch 200S. The power signal line transmits the power signal. The check signal line transmits at least one of the mode notification signal, the abnormality detection signal, and the display control signal between the slave switch 200S and another slave switch 200S or between the slave switch 200S and the master switch 200M. The CHECK_IN is a signal line for input, and the CHECK_OUT is a signal line for output.

As such, the master switch 200M outputs the PLC control signal via the duplexed signal line (OSSD1 and OSSD2). The slave switch 200S outputs the mode notification signal and the abnormality detection signal via the single signal line (CHECK_OUT). Accordingly, the slave switch 200S can simplify a switch configuration as a safety switch having little hindrance in the safety output. The master switch 200M can maintain safety output performance without simplifying the switch configuration as a safety switch having high importance in the safety output.

A main circuit of the master switch 200M and a main circuit of the slave switch 200S include, for example, the processor 211. The mode notification signal, the abnormality detection signal, and the display control signal may be transmitted by physically different signal lines. That is, a plurality of check signal lines may be respectively provided for the input and for the output. A color of each signal line is not limited to the example of FIG. 4.

Next, a display example of the safety switch 200 will be described. Here, as an example, a display example of the master switch 200M is illustrated.

Figure 5A:
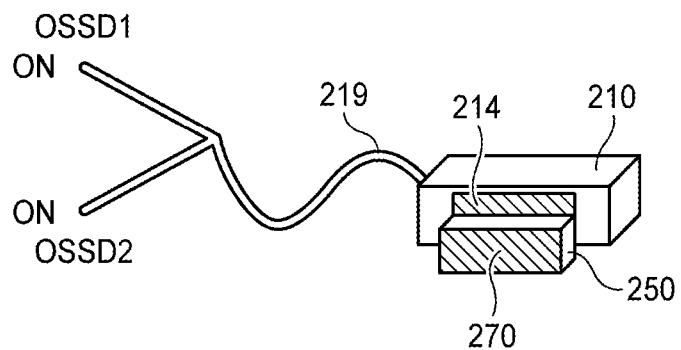
FIG. 5A is a schematic diagram illustrating a display example when the safety switch detects a closed state.

FIG. 5A is a schematic diagram illustrating a first display example and a first signal output example of the master switch 200M. In FIG. 5A, for example, when the system operation mode is in the system normal mode, and all the safety switches 200 provided in the switch system 5 detect the closed state, the master switch 200M is displayed in a display mode DM1 (for example, green lighting). Here, the master switch 200M outputs the PLC control signal indicating presence of no abnormality. For example, the master switch 200M outputs the PLC control signal in a state where the OSSD1 transmits the ON signal and the OSSD2 transmits the ON signal.

Figure 5B:
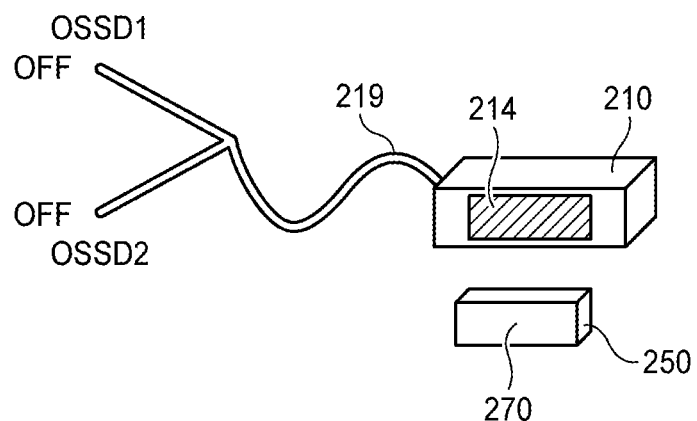
FIG. 5B is a schematic diagram illustrating a display example when the safety switch detects an open state.

FIG. 5B is a schematic diagram illustrating a second display example and a second signal output example of the master switch 200M. In FIG. 5B, for example, when the system operation mode is in the system normal mode, and the own switch detects the open state, the master switch 200M is displayed in a display mode DM2 (for example, red lighting). Here, the master switch 200M outputs the PLC control signal indicating presence of abnormality. For example, the master switch 200M outputs the PLC control signal in a state where the OSSD1 transmits the OFF signal and the OSSD2 transmits the OFF signal.

Figure 5C:
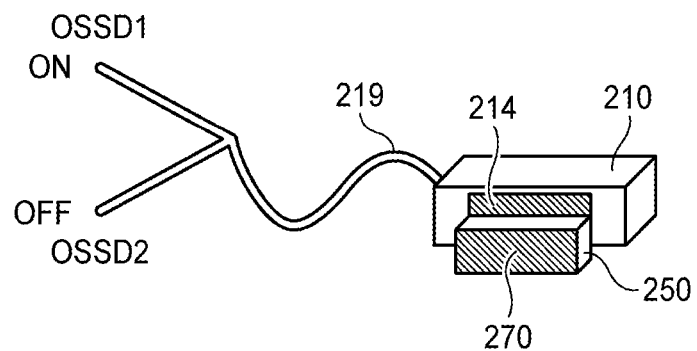
FIG. 5C is a diagram illustrating a display example when the safety switch detects a maintenance state.

FIG. 5C is a schematic diagram illustrating a third display example and a third signal output example of the master switch 200M. In FIG. 5C, for example, when the system operation mode is in the maintenance normal mode, and the own switch detects the closed state, the master switch 200M is displayed in a display mode DM3 (for example, yellow lighting). When the system operation mode is in the maintenance mode, the master switch 200M may be displayed in the display mode DM3 (for example, yellow lighting) without depending on a detection result of the own switch. Here, the master switch 200M outputs the PLC control signal indicating that the system operation mode is in the maintenance mode. For example, the master switch 200M outputs the PLC control signal in a state where the OSSD1 transmits the ON signal and the OSSD2 transmits the OFF signal.

Next, an operation example of the switch system 5 will be described.

Figure 6:
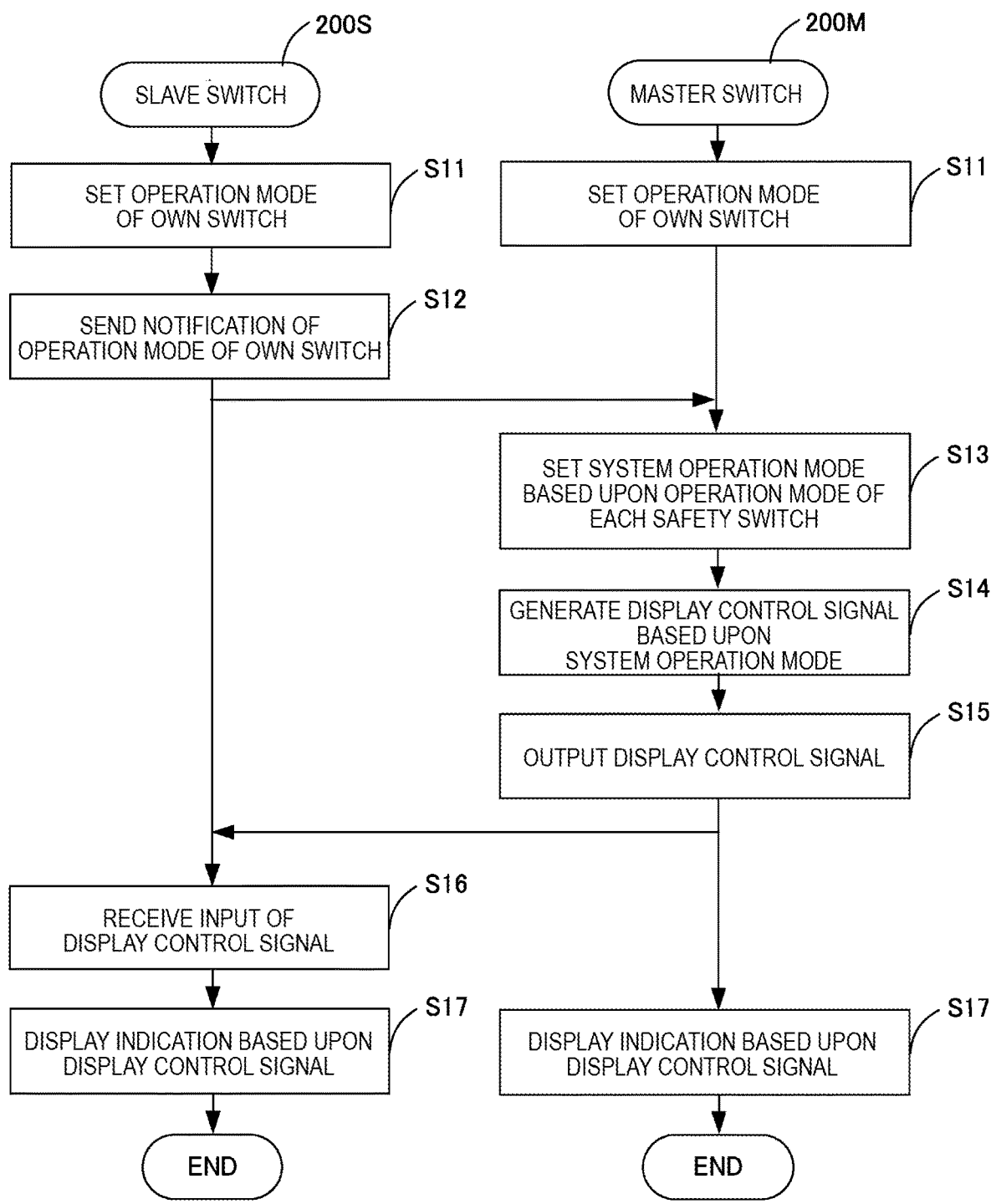
FIG. 6 is a sequence diagram illustrating an operation example of a switch system.

FIG. 6 is a sequence diagram showing the operation example of the switch system 5.

When detecting approach of the maintenance actuator 250m, the processor 211 of each safety switch 200 (the master switch 200M and the slave switch 200S) sets the operation mode of the own switch to the maintenance mode (S11). On the other hand, when not detecting the approach of the maintenance actuator 250m or when detecting approach of the normal actuator 250n, the processor 211 of each safety switch 200 sets the operation mode of the own switch to the normal mode (S11).

The input/output unit 219 of the slave switch 200S outputs the mode notification signal based upon the setting of the operation mode of the own switch to the safety switch 200 (the slave switch 200S or the master switch 200M) at a rear stage (S12). Since the safety switch 200 does not exist at the rear stage of the master switch 200M, the input/output unit 219 of the master switch 200M does not output the mode notification signal.

The mode notification signal is input to the input/output unit 219 of the master switch 200M from the safety switch 200 (the slave switch 200S) at a front stage. When recognizing that any one of the safety switches 200 is set to the maintenance mode by the operation mode of the own switch and the mode notification signal, the processor 211 of the master switch 200M sets the system operation mode to the system maintenance mode (S13). Here, the processor 211 of the master switch 200M generates a display control signal indicating that the system operation mode is in the system maintenance mode, and outputs the display control signal via the input/output unit 219 (S14).

On the other hand, when recognizing that neither the safety switches 200 is set to the maintenance mode by the operation mode of the own switch and the mode notification signal, the processor 211 of the master switch 200M sets the system operation mode to the system normal mode (S13). Here, the processor 211 of the master switch 200M generates a display control signal based upon the abnormality detection signal and the detection result of the own switch (S14). The input/output unit 219 of the master switch 200M outputs the display control signal (S15).

The display control signal is input to the input/output unit 219 of each slave switch 200S from the safety switch 200 at the front stage (another slave switch 200S or the master switch 200M) (S16).

When the display control signal indicates that the system operation mode is in the system maintenance mode, the processor 211 of each safety switch 200 performs a display indicating that the system operation mode is in the system maintenance mode (S17). Specifically, the light source 213 is displayed in the display mode DM3 (for example, yellow lighting). This display may be performed by all the safety switches 200 provided in the switch system 5.

Even though the system operation mode is in the maintenance mode, the processor 211 of the safety switch 200 detecting the open state as the detection result of the own switch may perform a display based upon the display control signal and the detection result of the own switch. Here, a display indicating that the own switch detects the open state may be performed. Here, the light source 213 may be displayed in the display mode DM2 (for example, red lighting).

On the other hand, when the display control signal indicates that the system operation mode is in the system normal mode, the processor 211 of each safety switch 200 performs a display based upon the detection result of abnormality by each safety switch 200 (S17). Specifically, the light source 213 is displayed in, for example, the display mode DM1 (for example, green light) or the display mode DM2 (for example, red lighting). The display may be performed by all the safety switches 200 provided in the switch system 5.

According to the above-described operation example of the switch system 5, when any one of the safety switches 200 is set to the maintenance mode, the system maintenance mode is set as the system operation mode. Next, each safety switch 200 provided in the switch system 5 performs the display indicating the system maintenance mode. That is, for example, the above-described display indicating that maintenance is in progress can be performed not only by the safety switch 200 including the sensor body 210 to which an operator allows the maintenance actuator 250m to move closer, but also by other safety switches 200. Accordingly, it is also possible to notify an operator located near any door 100 in which the safety switch 200 is installed that maintenance work is in progress inside the door 100.

When the system normal mode is set as the system operation mode, the switch system 5 can perform the display based upon the detection result of the abnormality by each safety switch 200 as usual.

Figure 7:
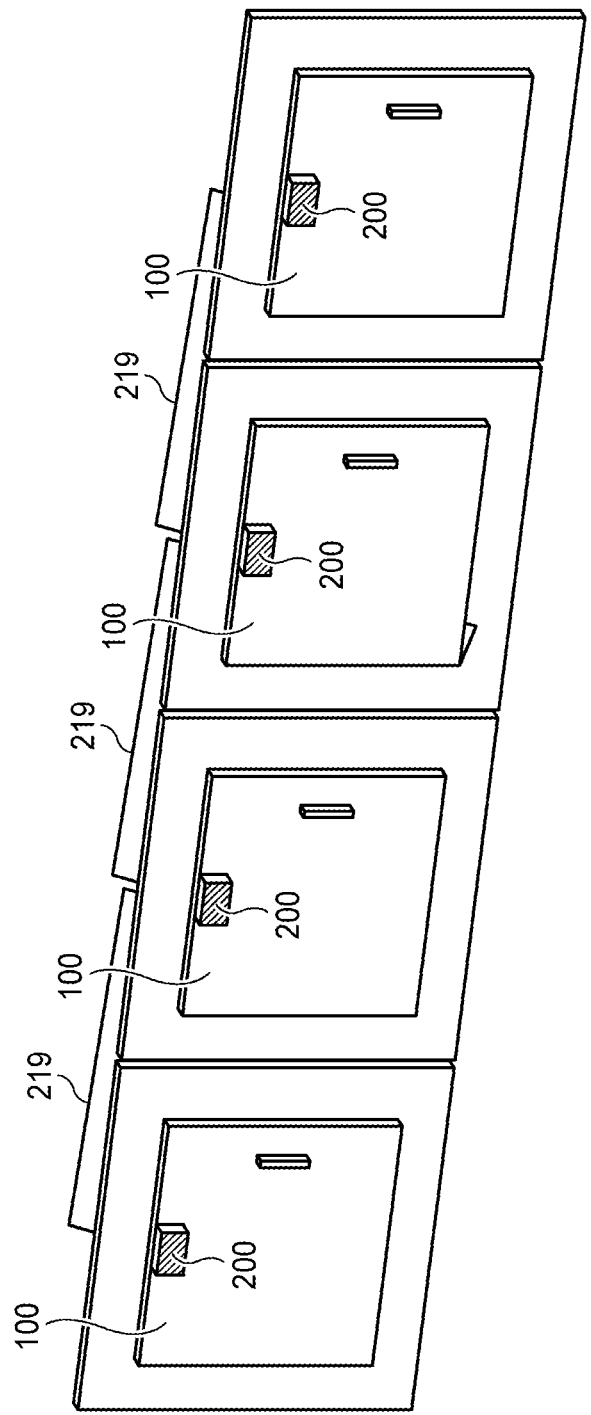
FIG. 7 is a diagram illustrating a display example showing that all the safety switches provided in the switch system are in a system maintenance mode.

FIG. 7 is a diagram illustrating a display example showing that all the safety switches 200 provided in the switch system 5 are in the system maintenance mode. As such, by performing a display indicating that all the safety switches 200 are in the maintenance mode, the operator can recognize that the maintenance work is in progress inside the door 100 (inside the device with the door 10) even though the operator is located near any one of the respective doors 100 in which each safety switch 200 is installed.

Next, a type of the system maintenance mode will be described.

The type of the system maintenance mode may be one type as described above. There may be a plurality of types of system maintenance modes. For example, the system maintenance mode includes an overall maintenance mode and an individual maintenance mode. The overall maintenance mode is an operation mode for notifying the safety PLC of the setting of the system maintenance mode without depending on the detection result of the abnormality by each safety switch 200 provided in the switch system 5. The individual maintenance mode is an operation mode for notifying the safety PLC of the setting of the system maintenance mode or the detection result of the abnormality, depending on the detection result of the abnormality by each safety switch 200 provided in the switch system 5.

The processor 211 of the master switch 200M may set whether to set the overall maintenance mode or the individual maintenance mode as the system maintenance mode. For example, the setting of the type of the system maintenance may be performed in advance and setting information may be stored in the memory 218, may be performed by a mode changeover switch by allowing the mode changeover switch to be provided in the master switch 200M, and may be performed by an input operation via an operation device connected to the master switch 200M.

First, an overview of the overall maintenance mode will be described.

In the overall maintenance mode, the master switch 200M sets the system operation mode to the overall maintenance mode only when the operation mode of the master switch 200M is set to the maintenance mode. Accordingly, the master switch 200M determines the system operation mode regardless of whether at least one operation mode of the slave switch 200S is set to the maintenance mode, that is, whether the mode notification signal indicates the maintenance mode.

When the sensor body 210 detects the maintenance actuator 250*m*, the master switch 200M sets the system operation mode to the overall maintenance mode and is displayed in the display mode DM3 (yellow lighting). Here, when another safety switch 200 (the slave switch 200S) in the switch system 5 detects the normal actuator 250*n*, another safety switch 200 is displayed in the display mode DM3 (yellow lighting). Here, the master switch 200M outputs the PLC control signal indicating the overall maintenance mode. In the PLC control signal indicating the overall maintenance mode, a signal to be transmitted by the OSSD1 is the ON signal, and a signal to be transmitted by OSSD2 is the OFF signal.

On the other hand, when the system operation mode is in the overall maintenance mode and the slave switch 200S does not detect the normal actuator 250*n*, the slave switch 200S not detecting the normal actuator 250*n* is displayed in the display mode DM2 (red lighting). Here as well, the master switch 200M outputs the PLC control signal indicating the overall maintenance mode.

When the sensor body 210 terminates the detection of the maintenance actuator 250*m*, the master switch 200M terminates the overall maintenance mode and sets the system operation mode to the system normal mode.

Therefore, for example, the operator allows the maintenance actuator 250*m* to move closer to the sensor body 210 of the master switch 200M, thereby making it possible to easily shift to the overall maintenance mode. The operator allows the maintenance actuator 250*m* to move away from the sensor body 210 of the master switch 200M, thereby making it possible to easily terminate the overall maintenance mode. The operator who operates the maintenance actuator 250*m* may be the same as or different from the operator who performs the maintenance.

The processor 211 of the master switch 200M may set sustainable time (for example, 12 hours) of the overall maintenance mode. Here, the processor 211 of the master switch 200M tracks the time after the overall maintenance mode is set, and when the sustainable time thereof has elapsed since the overall maintenance mode was set, the processor 211 of the master switch 200M terminates the overall maintenance mode. Here, the master switch 200M may set the signal to be transmitted by the OSSD1 as the OFF signal and set a display mode DM4 (yellow and red flashing). The yellow and red flashing indicates that yellow and red are displayed alternately. As a result, the operator can recognize that the sustainable time elapses and the overall maintenance mode ends. The master switch 200M may shift the system operation mode to the system normal mode after the lapse of the sustainable time after the overall maintenance mode is set. When the sensor body 210 detects the maintenance actuator 250*m* again, the master switch 200M resets the system operation mode to the overall maintenance mode.

Figure 8:
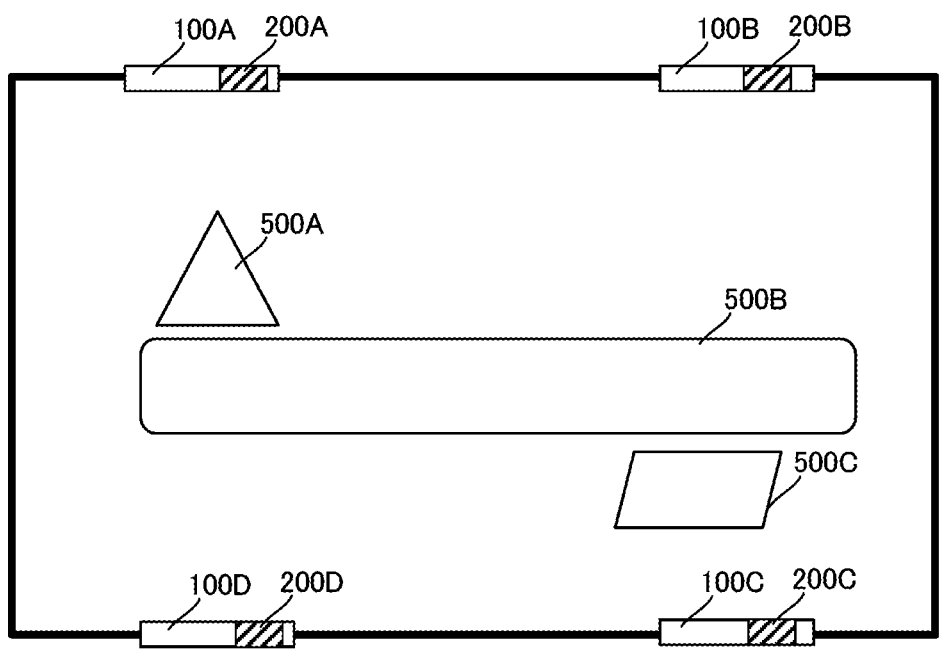
FIG. 8 is a diagram illustrating maintenance work by an operator.

An overview of the overall maintenance mode will be described with reference to FIG. 8. FIG. 8 is a diagram illustrating maintenance work by an operator of the embodiment. In FIG. 8, as the door 100, doors 100A to 100D are provided. As the safety switch 200, safety switches 200A to 200D are provided. As the internal device 500, internal devices 500A, 500B, and 500C are provided.

For example, it is assumed that an operator PA1 performs maintenance on the internal device 500A which is a target to be maintained. The internal device 500A is assumed to be a device for supplying air. First, an operator PA2 different from the operator PA1 allows the maintenance actuator 250*m* to approach the safety switch 200A (an example of the master switch 200M). Next, the safety switch 200A sets the system operation mode to the overall maintenance mode, and outputs the PLC control signal indicating that the system operation mode is in the maintenance mode to the safety PLC. Accordingly, the safety PLC controls each internal device 500 to perform an operation that is set as an operation for the overall maintenance mode. The internal device 500 performs the operation for the overall maintenance mode. Here, it is assumed that the operation for the overall maintenance mode is defined as an operation in which a part of operation of the internal device 500 is restricted, and air supply by the internal device 500A can be performed.

After the system operation mode shifts to the overall maintenance mode, the operator PA1 approaches the internal device 500A through the door 100A and performs maintenance on the internal device 500A. Here, for example, the operator PA1 opens the door 100A, and the safety switch 200A detects the open state. On the other hand, since the safety PLC does not stop the operation of the internal device 500A, the internal device 500A can continue to supply air. Accordingly, the switch system 5 can prevent the operator PA1 from being in a dangerous state in the device with the door 10.

It is assumed that another operator PA3 opens another door 100C after the system operation mode shifts to the overall maintenance mode. Here as well, since the safety PLC does not stop the operation of the internal device 500A as shown in the case of opening the door 100A, the internal device 500A can continue to supply air. Accordingly, the switch system 5 can prevent the operator PA1 from being in the dangerous state in the device with the door 10.

Each of the safety switches 200A to 200D uniformly performs the display indicating that the system operation mode is in the overall maintenance mode based upon the display control signal, such that any operator located near any of the doors 100A to 100D can recognize that maintenance is in progress inside the door 100. Accordingly, for example, it is possible to prevent a situation in which the operator PA3 operates the internal device 500C without recognizing that the maintenance is in progress such that the operator PA1 is put in a dangerous state.

Figure 9:
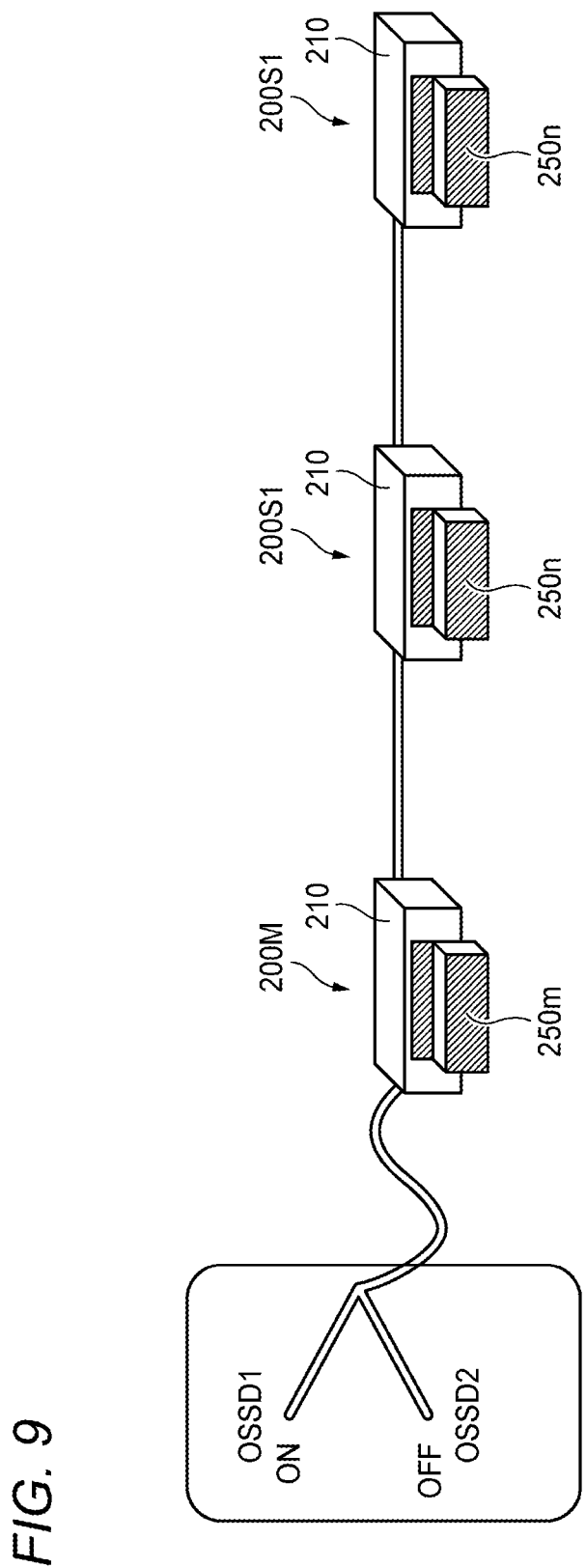
FIG. 9 is a schematic diagram illustrating a display example of a plurality of safety switches and an output example of a PLC control signal when all of the plurality of safety switches detect the closed state in an overall maintenance mode.

FIG. 9 is a schematic diagram illustrating a display example of a plurality of safety switches 200 and an output example of the PLC control signal when all of the plurality of safety switches 200 detect the closed state in the overall maintenance mode.

In FIG. 9, the master switch 200M detects approach of the maintenance actuator 250m to the sensor body 210 thereof, and sets the system operation mode to the overall maintenance mode. Accordingly, the master switch 200M detects the closed state of the own door. Slave switches 200S1 and 200S2 detect approach of the normal actuator 250n to the sensor body 210 thereof. Accordingly, the slave switches 200S1 and 200S2 detect the closed state of the own door.

Here, the master switch 200M performs a display indicating that the system operation mode is in the overall maintenance mode based upon the display control signal and the detection of the closed state of the own door. Here, the master switch 200M is displayed in the display mode DM3 (yellow lighting). The slave switches 200S1 and 200S2 perform a display indicating that the system operation mode is in the overall maintenance mode based upon the display control signal and the detection of the closed state of the own door. Here, the slave switches 200S1 and 200S2 are displayed in the display mode DM3 (yellow lighting).

Since the system operation mode is in the overall maintenance mode, the master switch 200M outputs the PLC control signal indicating that the system operation mode is in the overall maintenance mode. Specifically, in the OSSD1 and the OSSD2 that transmit the PLC control signal, the ON signal is output via the OSSD1 and the OFF signal is output via the OSSD2.

As such, when the system operation mode is in the overall maintenance mode and all the safety switches 200 provided in the switch system 5 illustrated in FIG. 9 detect the closed state, the switch system 5 displays that all the safety switches 200 are in the overall maintenance mode. The operator can understand that maintenance work is in progress in the device with the door 10 by confirming any one of the safety switches 200. The switch system 5 also outputs the PLC control signal indicating that the system operation mode is in the overall maintenance mode, such that the safety PLC can perform an operation specific to the overall maintenance mode (for example, some operations are restricted and an operation speed is slowed down).

Figure 10:
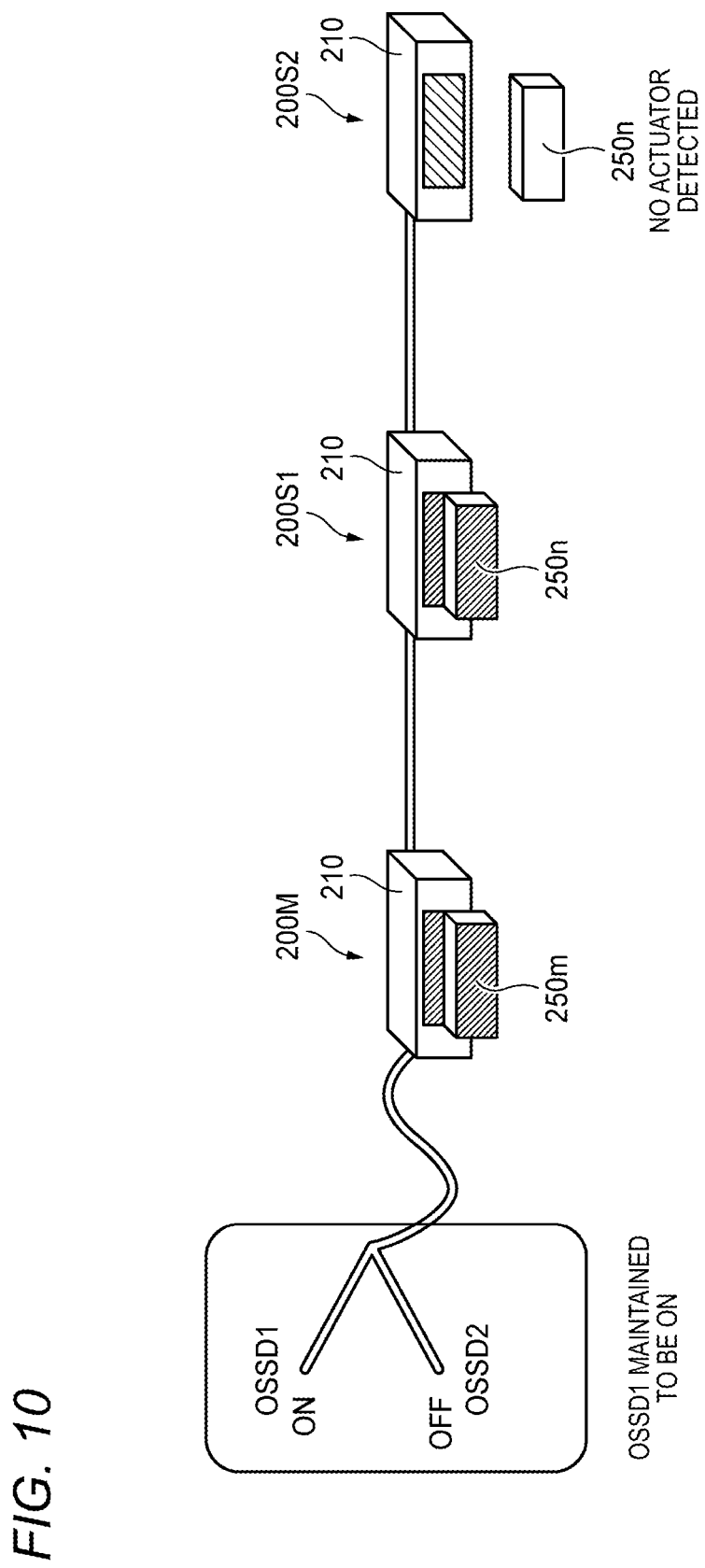
FIG. 10 is a schematic diagram illustrating a display example of the plurality of safety switches and an output example of the PLC control signal when a part of the plurality of safety switches detects the open state in the overall maintenance mode.

FIG. 10 is a schematic diagram illustrating a display example of the plurality of safety switches 200 and an output example of the PLC control signal when a part of the plurality of safety switches 200 detects the open state in the overall maintenance mode. FIG. 10 mainly describes a point different from that of FIG. 9, and the description of the same point will be omitted or simplified.

The point different from that of FIG. 9 is that the slave switch 200S2 does not detect the approach of the normal actuator 250n to the sensor body 210 thereof. Accordingly, the slave switch 200S2 detects the open state of the own door.

Here, the slave switch 200S2 performs a display indicating presence of abnormality (the open state of the own door is detected) based upon the display control signal and the detection of the open state of the own door. Here, the slave switch 200S2 is displayed in the display mode DM2 (red lighting).

When the system operation mode is in the overall maintenance mode, in the same manner as that of FIG. 9, the master switch 200M outputs the PLC control signal indicating that the system operation mode is in the overall maintenance mode regardless of whether there exists the safety switch 200 that detects the open state of the own door in the switch system 5.

As described above, in the switch system 5, the system operation mode is in the overall maintenance mode, and a part of the safety switch 200 provided in the switch system 5 illustrated in FIG. 10 detects the open state. Here, the safety switch 200 detecting the closed state displays that the system operation mode is in the overall maintenance mode, and the safety switch 200 detecting the open state performs the display indicating presence of abnormality.

The operator confirms the safety switch 200 that performs the maintenance display (the display mode DM3), thereby making it possible to understand that the maintenance work is in progress in the device with the door 10. The operator confirms the safety switch 200 that performs the display indicating presence of abnormality (the display mode DM2), thereby making it possible to recognize that the door 100 on which the safety switch 200 is installed is open and there is a possibility of danger occurrence.

The switch system 5 also outputs the PLC control signal indicating that the system operation mode is in the overall maintenance mode, such that the safety PLC can perform the operation specific to the overall maintenance mode. Accordingly, the operator confirms both the maintenance display and the display indicating the detection of the open state of the own door, such that the operation of the safety PLC is not stopped in the overall maintenance mode, thereby making it possible to recognize that there is a possibility of danger occurrence during the maintenance.

FIG. 11 is a diagram illustrating a detailed display example of each safety switch 200 when the system operation mode can be set to the overall maintenance mode. In FIG. 11, it is assumed that the switch system 5 includes one master switch 200M (also simply referred to as a master) and two slave switches 200S1 and 200S2 (also simply referred to as a slave 1 and a slave 2). FIG. 11 shows a system operation mode to be set (also referred to simply as a mode); a type of the actuator 250 that approaches each safety switch 200 (also simply referred to as an actuator); a detection result of the safety switch 200 (an own switch) (also simply referred to as detection); a display mode by the light source 213 (also simply referred to as LE D); and a content of the OSSD1 and the OSSD2. FIG. 11 shows, as an example, first to seventh cases when the overall maintenance mode can be set. The cases are summarized in a table T1.

In the first case, the normal actuator 250n is used for the master switch 200M. The sensor body 210 of the master switch 200M detects the normal actuator 250n. The normal actuator 250n is used for the slave switch 200S1. The sensor body 210 of the slave switch 200S1 detects the normal actuator 250n. The normal actuator 250n is used for the slave switch 200S2. The sensor body 210 of the slave switch 200S2 detects the normal actuator 250n.

Here, the master switch 200M sets the system operation mode to the system normal mode. Since all the safety switches 200 detect the closed state, the master switch 200M outputs the ON signal together via the OSSD1 and the OSSD2 to send a notification indicating presence of no abnormality. All the safety switches 200 (the master switch 200M and the slave switches 200S1 and 200S2) are displayed in the display mode DM1 (green lighting).

In the first case, the operator confirming any one of the safety switches 200 can also recognize that the system operation mode is in the system normal mode, the confirmed safety switch 200 detects presence of no abnormality (the corresponding door 100 is in the closed state), and other unconfirmed safety switches 200 also detect presence of no abnormality.

In the second case, the normal actuator 250n is used for the master switch 200M. The sensor body 210 of the master switch 200M detects the normal actuator 250n. The normal actuator 250n is used for the slave switch 200S1. The sensor body 210 of the slave switch 200S1 does not detect the normal actuator 250n. The normal actuator 250n is used for the slave switch 200S2. The sensor body 210 of the slave switch 200S2 detects the normal actuator 250n.

Here, the master switch 200M sets the system operation mode to the system normal mode. Since a part of the plurality of safety switches 200 detects the open state, the master switch 200M outputs the OFF signal together via the OSSD1 and the OSSD2 to send a notification indicating presence of abnormality. The master switch 200M and the slave switch 200S2 detecting the closed state are displayed in the display mode DM5 (green flashing). The slave switch 200S1 detecting the open state is displayed in the display mode DM2 (red lighting).

In the second case, the operator confirming the slave switch 200S1 can recognize presence of abnormality (the corresponding door 100 is in the open state). The operator confirming the master switch 200M and the slave switch 200S2 can recognize that the system operation mode is in the system normal mode, the master switch 200M and the slave switch 200S2 detect presence of no abnormality, and another safety switch 200 detects presence of the abnormality.

In the third case, the maintenance actuator 250m is used for the master switch 200M. The sensor body 210 of the master switch 200M detects the maintenance actuator 250m. The normal actuator 250n is used for the slave switch 200S1. The sensor body 210 of the slave switch 200S1 detects the normal actuator 250n. The normal actuator 250n is used for the slave switch 200S2. The sensor body 210 of the slave switch 200S2 detects the normal actuator 250n.

Here, the master switch 200M sets the system operation mode to the overall maintenance mode. The master switch 200M outputs the ON signal via the OSSD1 and the OFF signal via the OSSD2 to send a notification indicating that the system operation mode is in the overall maintenance mode. Since all the safety switches 200 detect the closed state, all the safety switches 200 (the master switch 200M and the slave switches 200S1 and 200S2) are displayed in the display mode DM3 (yellow lighting).

In the third case, the operator confirming any one of the safety switches 200 can also recognize that the confirmed safety switch 200 detects presence of no abnormality and maintenance is in progress.

In the fourth case, the maintenance actuator 250m is used for the master switch 200M. The sensor body 210 of the master switch 200M detects the maintenance actuator 250m. The normal actuator 250n is used for the slave switch 200S1. The sensor body 210 of the slave switch 200S1 detects the normal actuator 250n. The normal actuator 250n is used for the slave switch 200S2. The sensor body 210 of the slave switch 200S2 does not detect the normal actuator 250n.

Here, the master switch 200M sets the system operation mode to the overall maintenance mode. The master switch 200M outputs the ON signal via the OSSD1 and the OFF signal via the OSSD2 to send a notification indicating that the system operation mode is in the overall maintenance mode. The master switch 200M and the slave switch 200S1 detecting the closed state are displayed in the display mode DM3 (yellow lighting). The slave switch 200S2 detecting the open state is displayed in the display mode DM2 (red lighting).

In the fourth case, the operator confirming the slave switch 200S2 can recognize presence of abnormality. The operator confirming the master switch 200M and the slave switch 200S1 can recognize that the master switch 200M and the slave switch 200S1 detect presence of no abnormality and maintenance is in progress.

In the fifth case, the maintenance actuator 250m is used for the master switch 200M. The sensor body 210 of the master switch 200M detects the maintenance actuator 250m. The normal actuator 250n is used for the slave switch 200S1. The sensor body 210 of the slave switch 200S1 does not detect the normal actuator 250n. The normal actuator 250n is used for the slave switch 200S2. The sensor body 210 of the slave switch 200S2 detects the normal actuator 250n.

Here, the master switch 200M sets the system operation mode to the overall maintenance mode. The master switch 200M outputs the ON signal via the OSSD1 and the OFF signal via the OSSD2 to send a notification indicating that the system operation mode is in the overall maintenance mode. The master switch 200M and the slave switch 200S2 detecting the closed state are displayed in the display mode DM3 (yellow lighting). The slave switch 200S1 detecting the open state is displayed in the display mode DM2 (red lighting).

In the fifth case, the operator confirming the slave switch 200S1 can recognize presence of abnormality. The operator confirming the master switch 200M and the slave switch 200S2 can recognize that the master switch 200M and the slave switch 200S2 detect presence of no abnormality and maintenance is in progress.

In the sixth case, the maintenance actuator 250m is used for the master switch 200M. The sensor body 210 of the master switch 200M does not detect the maintenance actuator 250m. The normal actuator 250n is used for the slave switch 200S1. The sensor body 210 of the slave switch 200S1 detects the normal actuator 250n. The normal actuator 250n is used for the slave switch 200S2. The sensor body 210 of the slave switch 200S2 detects the normal actuator 250n.

Here, the master switch 200M sets the system operation mode to the system normal mode. Since a part of the plurality of safety switches 200 detects the open state, the master switch 200M outputs the OFF signal together via the OSSD1 and the OSSD2 to send a notification indicating presence of abnormality. The master switch 200M detecting the open state is displayed in the display mode DM2 (red lighting). The slave switches 200S1 and 200S2 detecting the closed state are displayed in the display mode DM5 (green flashing).

In the sixth case, the operator confirming the master switch 200M can recognize presence of the abnormality. The operator confirming the slave switches 200S1 and 200S2 can recognize that the system operation mode is in the system normal mode, the slave switches 200S1 and 200S2 detect presence of no abnormality, and another safety switch 200 detects presence of the abnormality.

In the seventh case, the maintenance actuator 250m is used for the master switch 200M. The sensor body 210 of the master switch 200M detects the maintenance actuator 250m. The normal actuator 250n is used for the slave switch 200S1. The sensor body 210 of the slave switch 200S1 detects the normal actuator 250n. The normal actuator 250n is used for the slave switch 200S2. The sensor body 210 of the slave switch 200S2 detects the normal actuator 250n.

Here, the master switch 200M sets the system operation mode to the overall maintenance mode. In the seventh case, it is assumed that the sustainable time of the overall maintenance mode has elapsed since the system operation mode was set to the overall maintenance mode. Here, the master switch 200M terminates the overall maintenance mode. Here, the master switch 200M outputs the OFF signal together via the OSSD1 and the OSSD2 to send a notification indicating presence of abnormality. All the safety switches 200 (the master switch 200M and the slave switches 200S1 and 200S2) are displayed in the display mode DM4 (yellow and red flashing) based upon the display control signal indicating that the overall maintenance mode exceeds the sustainable time.

In the seventh case, the operator confirming any one of the safety switches 200 can also recognize that the confirmed safety switch 200 detects presence of no abnormality, and that the maintenance mode exceeds the sustainable time and then shifts to the normal mode.

Next, an overview of the individual maintenance mode will be described.

In the individual maintenance mode, the master switch 200M sets the system operation mode to the individual maintenance mode when the operation mode of any one of the safety switches 200 becomes the maintenance mode. Accordingly, the master switch 200M is not limited to the operation mode of the master switch 200M, and even when the operation mode of the slave switch 200S is set to the maintenance mode, the master switch 200M sets the system operation mode to the individual maintenance mode.

When the sensor body 210 of the safety switch 200 (the master switch 200M or the slave switch 200S) detects the maintenance actuator 250m, the safety switch 200 sets the operation mode of the own switch to the maintenance mode. The slave switch 200S notifies the master switch 200M of the mode notification signal indicating the maintenance mode. When recognizing that the operation mode of any one of the safety switches 200 becomes the maintenance mode by the mode notification signal or the detection result of the own switch, the master switch 200M sets the system operation mode to the individual maintenance mode. Here, when all the safety switches 200 in the switch system 5 detect the actuator 250 (the normal actuator 250n or the maintenance actuator 250m), each safety switch 200 is displayed in the display mode DM3 (yellow lighting). Here, the master switch 200M outputs the PLC control signal indicating the individual maintenance mode. In the PLC control signal indicating the individual maintenance mode, a signal to be transmitted by the OSSD1 is the OFF signal, and a signal to be transmitted by the OSSD2 is the ON signal.

On the other hand, when the system operation mode is in the individual maintenance mode and a part of the safety switches 200 in the switch system 5 does not detect the actuator 250, the safety switch 200 that does not detect the actuator 250 is displayed in the display mode DM2 (red lighting), and other safety switches 200 that detect the actuator 250 are displayed in the display mode DM6 (yellow and red flashing). Here, the master switch 200M outputs the PLC control signal indicating presence of abnormality. In the PLC control signal indicating presence of the abnormality, both the signals to be transmitted by the OSSD1 and the OSSD2 are the OFF signals.

The display mode DM4 (yellow and red flashing) and the display mode DM6 have the same display color, but for example, a ratio of yellow display time and red display time at the time of flashing is different, such that a difference therebetween can be visually identified.

When the sensor body 210 of the safety switch 200 that detects the maintenance actuator 250m terminates the detection of the maintenance actuator 250m, the safety switch 200 terminates the individual maintenance mode and sets the system operation mode to the normal mode.

Therefore, for example, the operator allows the maintenance actuator 250m to move closer to the sensor body 210 of any one of the safety switches 200, thereby making it possible to easily shift to the individual maintenance mode. The operator allows the maintenance actuator 250m to move away from the sensor body 210 of the safety switch 200, thereby making it possible to easily terminate the individual maintenance mode.

The master switch 200M may set sustainable time (for example, 12 hours) of the individual maintenance mode. Here, the master switch 200M tracks the time after the individual maintenance mode is set, and when the sustainable time thereof has elapsed since the individual maintenance mode was set, the master switch 200M terminates the individual maintenance mode. Here, the master switch 200M may set the signal transmitted by the OSSD2 to the OFF signal and set the display mode DM4 (yellow and red flashing). As a result, the operator can recognize that the sustainable time elapses and the individual maintenance mode ends. The master switch 200M may shift the system operation mode to the system normal mode after the lapse of the sustainable time after the individual maintenance mode is set. When the sensor body 210 detects the maintenance actuator 250m again, the master switch 200M resets the system operation mode to the individual maintenance mode.

An overview of the individual maintenance mode will be also described with reference to FIG. 8.

For example, it is assumed that an operator PB1 performs maintenance on the internal device 500A which is a target to be maintained. First, when an operator PB2 different from the operator PB1 allows the maintenance actuator 250m to move closer to the safety switch 200A, the operation mode of the safety switch 200A becomes the maintenance mode. Therefore, the master switch 200M sets the system operation mode to the individual maintenance mode, and outputs the PLC control signal based upon the individual maintenance mode and the detection result of abnormality of each safety switch 200 to the safety PLC.

Here, when all the safety switches 200A detect presence of no abnormality (the closed state), the PLC control signal indicating that the maintenance mode is set is output. On the other hand, when at least one of the safety switches 200A detects presence of abnormality (the open state), the PLC control signal indicating that there exits the abnormality is output. The PLC control signal indicating presence of the abnormality may be the same as the PLC control signal indicating presence of the abnormality in the system normal mode.

When the PLC control signal indicating that the maintenance mode is set is input to the safety PLC, the safety PLC controls each internal device 500 to perform an operation that is set as an operation of the individual maintenance mode. The internal device 500 performs the operation for the individual maintenance mode. On the other hand, when the PLC control signal indicating presence of abnormality is input to the safety PLC, the safety PLC stops the operation of each internal device 500.

After the system operation mode shifts to the individual maintenance mode, the operator PB1 approaches the internal device 500A through the door 100A and performs the maintenance on the internal device 500A. Here, for example, the operator PB2 opens the door 100A, and the safety switch 200A detects the open state. Here, since the PLC control signal indicating presence of abnormality is input to the safety PLC, the safety PLC stops the operation of the internal device 500A. It is assumed that another operator PB3 opens another door 100C after the system operation mode shifts to the individual maintenance mode. Here as well, the safety PLC stops the operation of the internal device in the same manner as when the door 100A is open.

Accordingly, even when the operator PB1 performs the maintenance on the internal device 500A, and another operator PB3, who is difficult to see the operator PB1 performing the maintenance thereon, opens another door 100C and enters into the device with the door 10, the switch system 5 stops each internal device. As a result, even though the operator PB1 performs maintenance work at a location that is difficult to be seen in the device with the door 10, the switch system 5 can prevent another operator PB3 from being in a dangerous state.

Each of the safety switches 200A to 200D is displayed based upon the display control signal and the detection result of the abnormality of each safety switch 200, such that the operator confirming the display can recognize that maintenance is in progress or that there is a state in which there exits abnormality. Accordingly, for example, it is possible to prevent the operator PA3 from entering into the device with the door 10 through the door 100C without knowing that the maintenance is in progress and being in a dangerous state.

Figure 12:
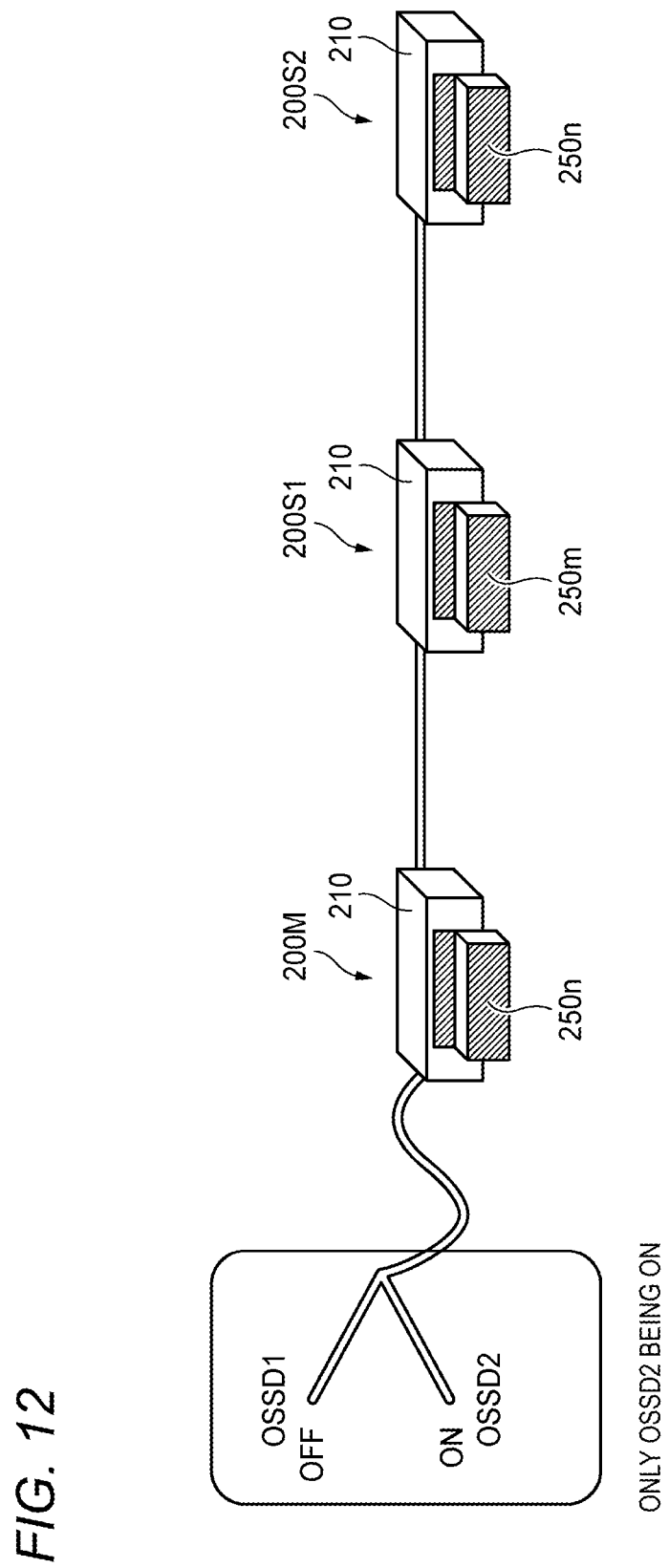
FIG. 12 is a schematic diagram illustrating a first display example of a plurality of safety switches and a first output example of the PLC control signal when all of the plurality of safety switches detect the closed state in an individual maintenance mode.

FIG. 12 is a schematic diagram illustrating a first display example of the plurality of safety switches 200 and a first output example of the PLC control signal when all of the plurality of safety switches 200 detect the closed state in the individual maintenance mode.

In FIG. 12, the slave switch 200S1 detects the approach of the maintenance actuator 250m to the sensor body 210 thereof, sets the operation mode of the own switch to the maintenance mode, and outputs a mode notification signal indicating the maintenance mode. The mode notification signal is input to the master switch 200M, and the master switch 200M sets the system operation mode to the individual maintenance mode based upon the mode notification signal.

Since the slave switch 200S1 detects the approach of the maintenance actuator 250m, the slave switch 200S1 detects the closed state of the own door. The master switch 200M and the slave switch 200S2 detect the approach of the normal actuator 250n to the sensor body 210 thereof. Accordingly, the master switch 200M and the slave switch 200S2 detect the closed state of the own door.

Here, the master switch 200M and the slave switches 200S1 and 200S2 perform a display indicating that the system operation mode is in the individual maintenance mode based upon the display control signal and the detection of the closed state of the own door. Here, the master switch 200M and the slave switches 200S1 and 200S2 are displayed in the display mode DM3 (yellow lighting).

Since the master switch 200M detects that the system operation mode is in the individual maintenance mode and all the safety switches 200 detect the closed state, the master switch 200M outputs the PLC control signal indicating that the system operation mode is in the individual maintenance mode. Specifically, in the OSSD1 and OSSD2 that transmit the PLC control signal, the OFF signal is output via the OSSD1 and the ON signal is output via the OSSD2.

As such, when the system operation mode is in the individual maintenance mode and all the safety switches 200 provided in the switch system 5 illustrated in FIG. 12 detect the closed state, the switch system 5 displays that all the safety switches 200 are in the individual maintenance mode. Even when confirming any of the safety switches 200O, the operator can understand that the maintenance work is in progress in the device with the door 10. The switch system 5 also outputs the PLC control signal indicating that the system operation mode is in the individual maintenance mode, such that the safety PLC can perform an operation specific to the individual maintenance mode (for example, some operations are restricted and an operation speed is slowed down).

Figure 13:
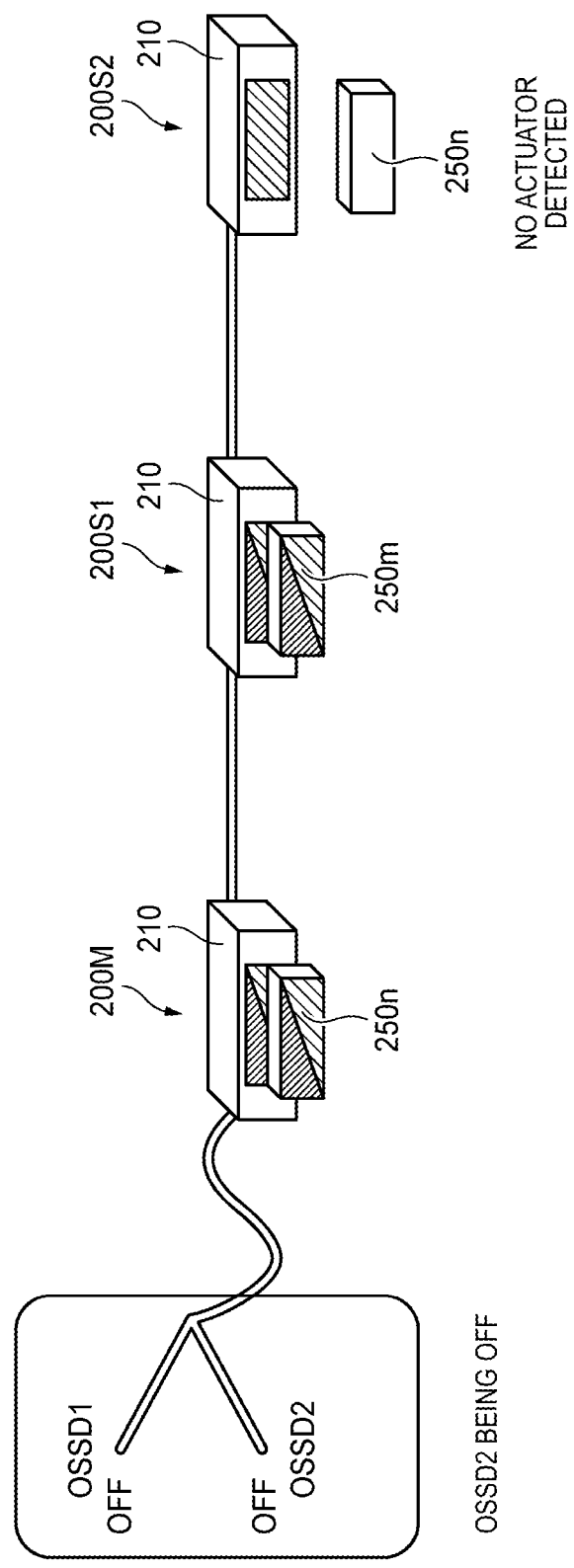
FIG. 13 is a schematic diagram illustrating a first display example of the plurality of safety switches and a first output example of a PLC control signal of a master switch when a part of the plurality of safety switches detects the open state in the individual maintenance mode.

FIG. 13 is a schematic diagram illustrating a first display example of the plurality of safety switches 200 and a first output example of the PLC control signal when a part of the plurality of safety switches 200 detects the open state in the individual maintenance mode. FIG. 13 mainly describes a point different from that of FIG. 12, and the description of the same point will be omitted or simplified.

The point different from that of FIG. 12 is that the slave switch 200S2 does not detect the approach of the normal actuator 250n to the sensor body 210 thereof. Accordingly, the slave switch 200S2 detects the open state of the own door.

Here, the slave switch 200S2 performs a display indicating that the open state of the own door is detected based upon the display control signal and the detection of the open state of the own door. Here, the slave switch 200S2 is displayed in the display mode DM2 (red lighting).

Based upon the display control signal and the detection of the closed state of the own door, the master switch 200M and the slave switch 200S1 are in the individual maintenance mode, detect the open state of the own door, and perform a display indicating that another safety switch 200 detects the open state of corresponding another door. Here, the master switch 200M and the slave switch 200S1 are displayed in the display mode DM6 (yellow and red flashing).

The master switch 200M recognizes that the system operation mode is the individual maintenance mode and that the safety switch 200 that detects the open state of the own door exists in the switch system 5. Here, in a different manner as that of FIG. 12, the master switch 200M outputs the PLC control signal indicating presence of abnormality.

As described above, in the switch system 5, the system operation mode is in the individual maintenance mode, and a part of the safety switches 200 provided in the switch system 5 illustrated in FIG. 13 detects the closed state. Here, the safety switch 200 detecting the closed state is in the individual maintenance mode, and performs the display indicating that another safety switch 200 detects the open state of corresponding another door. The safety switch 200 detecting the open state performs the display indicating the detection of the open state of the own door.

Accordingly, the operator confirms the safety switch 200 which is in the maintenance mode and performs the display (the display mode DM6) indicating that another safety switch 200 detects the open state of another door, thereby making it possible to understand that the maintenance work is in progress in the device with the door 10. The operator confirms the safety switch 200 that performs the display (the display mode DM2) indicating the detection of the open state of the own door, thereby making it possible to recognize that the door 100 on which the safety switch 200 is installed is open and there is a possibility of danger occurrence.

The safety PLC can stop the internal device by allowing the switch system 5 to output the PLC control signal indicating presence of abnormality. Accordingly, even though the individual maintenance mode is being set, the safety of the operator during the maintenance work can be improved when there is the opened door 100 in the device with the door 10.

Figure 14:
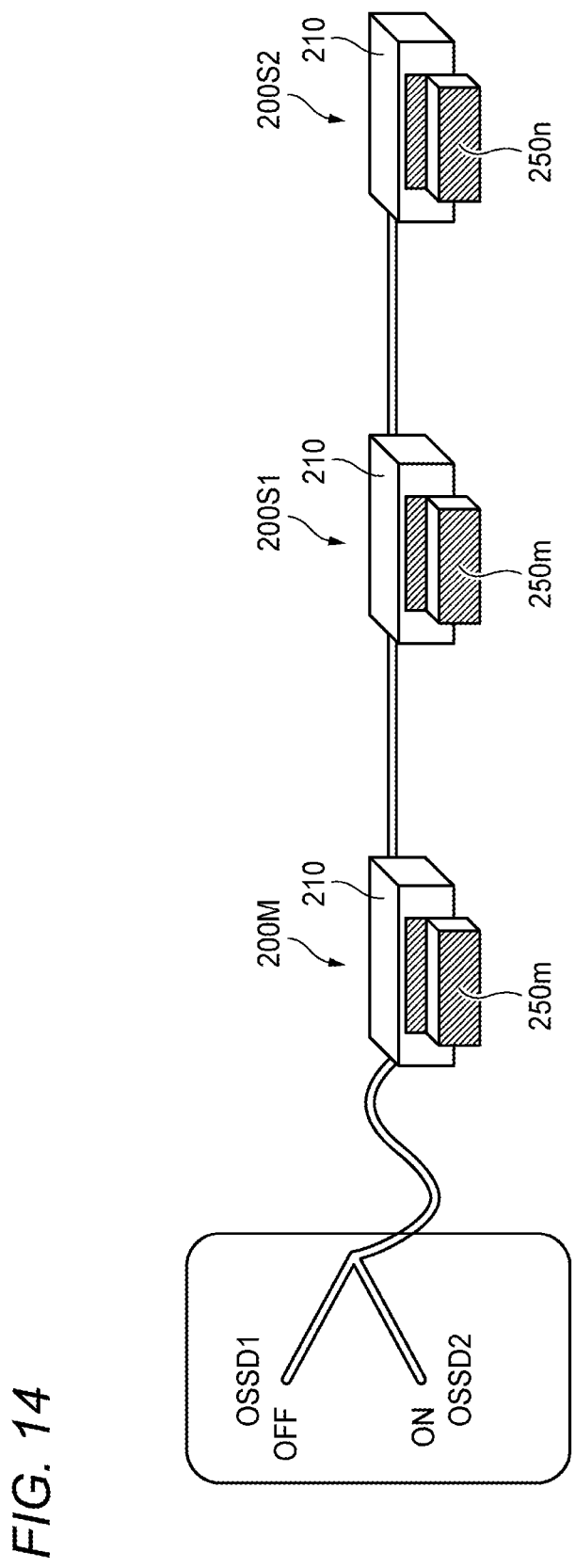
FIG. 14 is a schematic diagram illustrating a second display example of the plurality of safety switches and a second output example of the PLC control signal when all of the plurality of safety switches detect the closed state in the individual maintenance mode.

FIG. 14 is a schematic diagram illustrating a second display example of the plurality of safety switches 200 and a second output example of the PLC control signal when all of the plurality of safety switches 200 detect the close state in the individual maintenance mode. FIG. 14 mainly describes a point different from that of FIG. 12, and the description of the same point will be omitted or simplified.

The point different from that of FIG. 12 is that the maintenance actuator 250m is detected by the sensor body 210 of the plurality of safety switches 200 provided in the switch system 5. In FIG. 14, the master switch 200M and the slave switch 200S1 detect the maintenance actuator 250m.

In FIG. 14, the slave switch 200S1 detects the approach of the maintenance actuator 250m to the sensor body 210 thereof, sets the operation mode of the own switch to the maintenance mode, and outputs the mode notification signal indicating the maintenance mode. The master switch 200M detects the approach of the maintenance actuator 250m to the sensor body 210 thereof, and sets the operation mode of the own switch to the maintenance mode. The master switch 200M sets the system operation mode to the individual maintenance mode based upon any one of the operation mode of the own switch and the mode notification signal. Since an operation after the system operation mode by the switch system 5 is set to the individual maintenance mode is the same as the operation shown in FIG. 12, the description thereof will be omitted.

Figure 15:
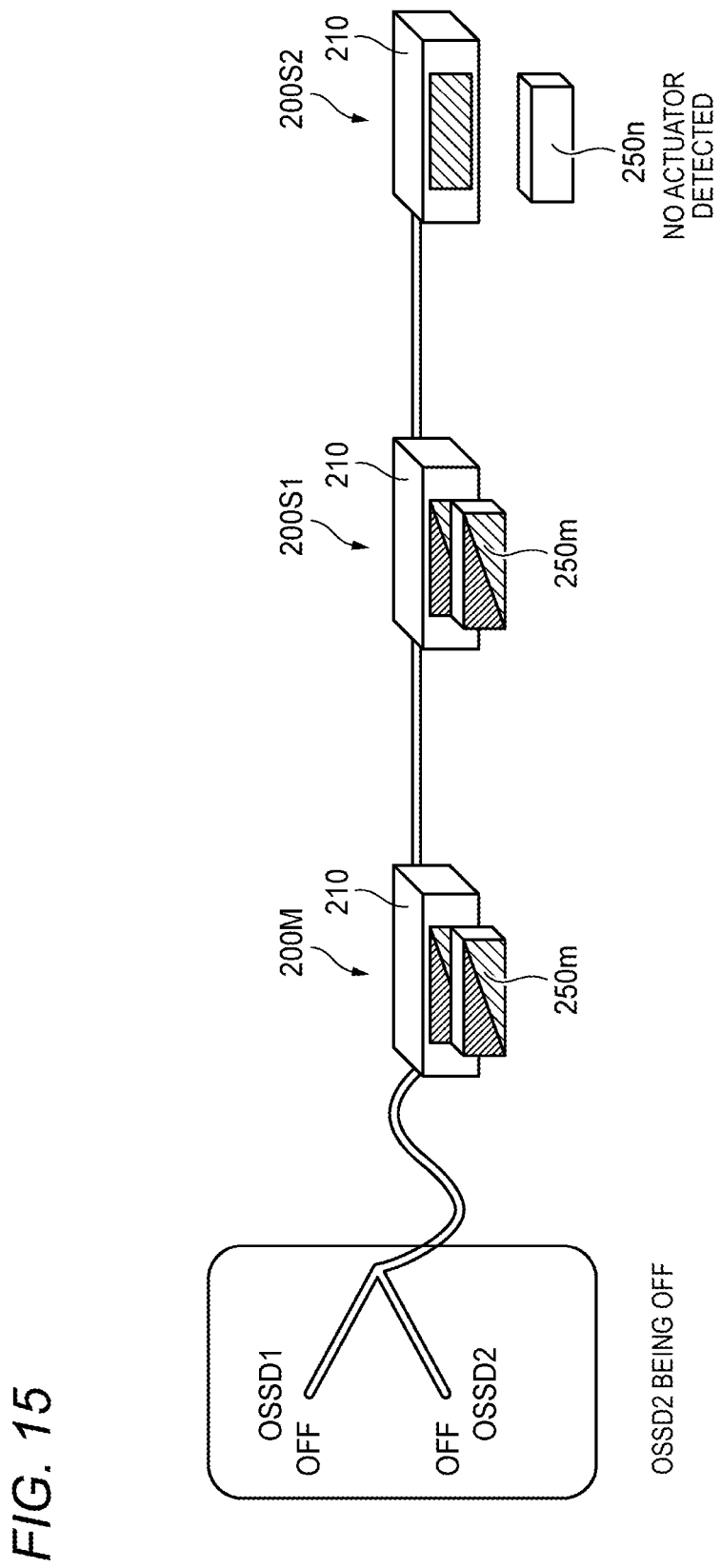
FIG. 15 is a schematic diagram illustrating a second display example of the plurality of safety switches and a second output example of the PLC control signal of the master switch when a part of the plurality of safety switches detects the open state in the individual maintenance mode.

FIG. 15 is a schematic diagram illustrating a second display example of the plurality of safety switches 200 and a second output example of the PLC control signal when a part of the plurality of safety switches 200 detects the open state in the individual maintenance mode. FIG. 15 mainly describes a point different from that of FIG. 13, and the description of the same point will be omitted or simplified.

The point different from that of FIG. 13 is that the maintenance actuator 250m is detected by the sensor body 210 of the plurality of safety switches 200 provided in the switch system 5. In FIG. 15, the master switch 200M and the slave switch 200S1 detect the maintenance actuator 250m. A point different from that of FIG. 14 is that the slave switch 200S2 does not detect the approach of the normal actuator 250n to the sensor body 210 thereof.

In FIG. 15, in the same manner as that of FIG. 14, the master switch 200M sets the system operation mode to the individual maintenance mode based upon any one of the operation mode of the own switch and the mode notification signal. Since the operation after the system operation mode by the switch system 5 is set to the individual maintenance mode is the same as the operation shown in FIG. 13, the description thereof will be omitted.

FIG. 16 is a diagram illustrating a detailed display example of each safety switch 200 when the system operation mode can be set to the individual maintenance mode. In FIG. 16, the description of the same point as that of FIG. 11 will be omitted or simplified. FIG. 16 shows, as an example, first to eighth cases when the system operation mode can be set to the individual maintenance mode. The cases are summarized in a table T2. In FIG. 16, when a display and an output are the same as those of the first to seventh cases illustrated in FIG. 11 when the system operation mode can be set to the overall maintenance mode, the description thereof will be omitted or simplified.

The first case is the same as the first case illustrated in FIG. 11 when the system operation mode can be set to the overall maintenance. The second case is the same as the second case illustrated in FIG. 11 when the system operation mode can be set to the overall maintenance mode.

In the third case, the normal actuator 250n is used for the master switch 200M. The sensor body 210 of the master switch 200M detects the normal actuator 250n. The maintenance actuator 250m is used for the slave switch 200S1. The sensor body 210 of the slave switch 200S1 detects the maintenance actuator 250m. The normal actuator 250n is used for the slave switch 200S2. The sensor body 210 of the slave switch 200S2 detects the normal actuator 250n.

Here, the master switch 200M sets the system operation mode to the individual maintenance mode. The master switch 200M outputs the OFF signal via the OSSD1 and the ON signal via the OSSD2 to send a notification indicating that the system operation mode is in the individual maintenance mode. Since all the safety switches 200 detect the closed state, all the safety switches 200 (the master switch 200M and the slave switches 200S1 and 200S2) are displayed in the display mode DM3 (yellow lighting).

In the third case, the operator confirming any one of the safety switches 200 can also recognize that the confirmed safety switch 200 detects presence of no abnormality and maintenance is in progress.

In the fourth case, the normal actuator 250n is used for the master switch 200M. The sensor body 210 of the master switch 200M detects the normal actuator 250n. The maintenance actuator 250m is used for the slave switch 200S1. The sensor body 210 of the slave switch 200S1 detects the maintenance actuator 250m. The maintenance actuator 250m is used for the slave switch 200S2. The sensor body 210 of the slave switch 200S2 detects the maintenance actuator 250m.

Here, the master switch 200M sets the system operation mode to the individual maintenance mode. The master switch 200M outputs the OFF signal via the OSSD1 and the ON signal via the OSSD2 to send a notification indicating that the system operation mode is in the individual maintenance mode. Since all the safety switches 200 detect the closed state, all the safety switches 200 (the master switch 200M and the slave switches 200S1 and 200S2) are displayed in the display mode DM3 (yellow lighting).

In the fourth case, the operator confirming any one of the safety switches 200 can also recognize that the confirmed safety switch 200 detects presence of no abnormality and maintenance is in progress.

In the fifth case, the normal actuator 250*n* is used for the master switch 200M. The sensor body 210 of the master switch 200M does not detect the normal actuator 250*n*. The maintenance actuator 250*m* is used for the slave switch 200S1. The sensor body 210 of the slave switch 200S1 detects the maintenance actuator 250*m*. The maintenance actuator 250*m* is used for the slave switch 200S2. The sensor body 210 of the slave switch 200S2 detects the maintenance actuator 250*m*.

Here, the master switch 200M sets the system operation mode to the individual maintenance mode. Since a part of the plurality of safety switches 200 in the switch system 5 detects the open state, the master switch 200M outputs the OFF signal together via the OSSD1 and the OSSD2 to send a notification indicating presence of abnormality. The master switch 200M detecting the open state is displayed in the display mode DM2 (red lighting). The slave switch 200S1 and the slave switch 200S2 detecting the closed state are displayed in the display mode DM6 (yellow and red flashing).

In the fifth case, the operator confirming the master switch 200M can recognize presence of abnormality. The operator confirming the slave switches 200S1 and 200S2 can also recognize that the slave switches 200S1 and 200S2 detect presence of no abnormality, maintenance is in progress, and at least one of the doors 100 corresponding to another safety switch 200 is open.

In the sixth case, the maintenance actuator 250*m* is used for the master switch 200M. The sensor body 210 of the master switch 200M detects the maintenance actuator 250*m*. The maintenance actuator 250*m* is used for the slave switch 200S1. The sensor body 210 of the slave switch 200S1 does not detect the maintenance actuator 250*m*. The maintenance actuator 250*m* is used for the slave switch 200S2. The sensor body 210 of the slave switch 200S2 detects the maintenance actuator 250*m*.

Here, the master switch 200M sets the system operation mode to the individual maintenance mode. Since a part of the plurality of safety switches 200 in the switch system 5 detects the open state, the master switch 200M outputs the OFF signal together via the OSSD1 and the OSSD2 to send a notification indicating presence of abnormality. The slave switch 200S1 detecting the open state is displayed in the display mode DM2 (red lighting). The master switch 200M and the slave switch 200S2 detecting the closed state are displayed in the display mode DM6 (yellow and red flashing).

In the sixth case, the operator confirming the slave switch 200S1 can recognize presence of abnormality. The operator confirming the master switch 200M and the slave switch 200S2 can also recognize that the master switch 200M and the slave switch 200S2 detect presence of no abnormality, maintenance is in progress, and at least one of the doors 100 corresponding to another safety switch 200 is open.

In the seventh case, the normal actuator 250*n* is used for the master switch 200M. The sensor body 210 of the master switch 200M detects the normal actuator 250*n*. The maintenance actuator 250*m* is used for the slave switch 200S1. The sensor body 210 of the slave switch 200S1 does not detect the maintenance actuator 250*m*. The maintenance actuator 250*m* is used for the slave switch 200S2. The sensor body 210 of the slave switch 200S2 does not detect the maintenance actuator 250*m*.

Here, the master switch 200M sets the system operation mode to the system normal mode. Since a part of the plurality of safety switches 200 detects the open state, the master switch 200M outputs the OFF signal together via the OSSD1 and the OSSD2 to send a notification indicating presence of abnormality. The slave switches 200S1 and 200S2 detecting the open state are displayed in the display mode DM2 (red lighting). The master switch 200M detecting the closed state is displayed in the display mode DM5 (green flashing).

In the seventh case, the operator confirming the slave switches 200S1 and 200S2 can recognize presence of abnormality. The operator confirming the master switch 200M can recognize that the system operation mode is in the system normal mode, the slave switches 200S1 and 200S2 detect presence of no abnormality, and another safety switch 200 detects presence of abnormality.

In the eighth case, the normal actuator 250*n* is used for the master switch 200M. The sensor body 210 of the master switch 200M detects the normal actuator 250*n*. The maintenance actuator 250*m* is used for the slave switch 200S1. The sensor body 210 of the slave switch 200S1 detects the maintenance actuator 250*m*. The maintenance actuator 250*m* is used for the slave switch 200S2. The sensor body 210 of the slave switch 200S2 detects the maintenance actuator 250*m*.

Here, the master switch 200M sets the system operation mode to the individual maintenance mode. In the eighth case, it is assumed that sustainable time of the individual maintenance mode has elapsed since the individual maintenance mode was set. Here, the master switch 200M terminates the individual maintenance mode. Here, the master switch 200M outputs the OFF signal together via the OSSD1 and the OSSD2 to send a notification indicating presence of abnormality. All the safety switches 200 (the master switch 200M and the slave switches 200S1 and 200S2) are displayed in the display mode DM4 (yellow and red flashing), based upon the display control signal indicating that the individual maintenance mode exceeds the sustainable time.

In the eighth case, the operator confirming any one of the safety switches 200 can also recognize that the confirmed safety switch 200 detects presence of no abnormality, and that the maintenance mode exceeds the sustainable time and then shifts to the normal mode.

Figure 17:
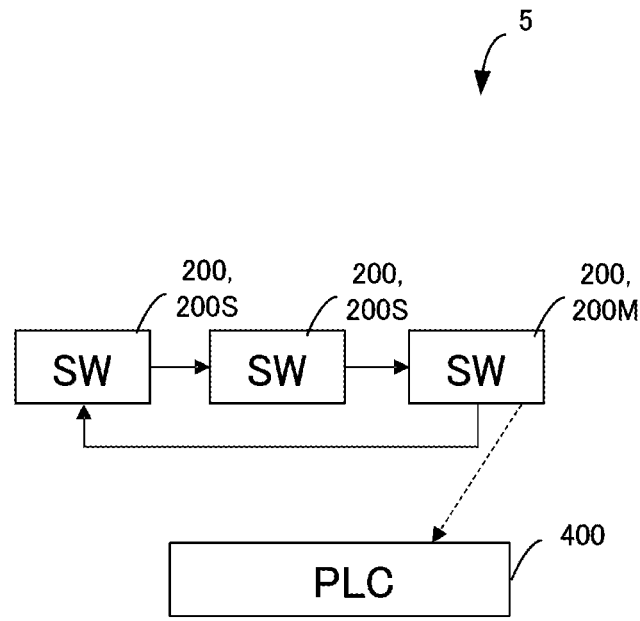
FIG. 17 is a diagram illustrating an example of a connection relationship between a plurality of safety switches and a safety PLC.

Next, a connection relationship between the plurality of safety switches 200 and the safety PLC 400 will be described. FIG. 17 is a diagram illustrating an example of the connection relationship between the plurality of safety switches 200 and the safety PLC 400.

In FIG. 17, the respective safety switches 200 are circularly connected in series, that is, connected to loop. Then, the safety switch 200 at the last rear stage, that is, the master switch 200M is connected to the safety PLC 400. In FIG. 17, the setting of the system operation mode and the generation of the display control signal are performed by the master switch 200M.

In FIG. 17, the input/output unit 219 of each slave switch 200S outputs the mode notification signal and the abnormality detection signal to another adjacent safety switch 200 at a rear stage. The input/output unit 219 of the master switch 200M acquires the mode notification signal and the abnormality detection signal. The processor 211 of the master switch 200M sets the system operation mode based upon the mode notification signal and the operation mode of the own switch.

The master switch 200M generates the display control signal based upon the system operation mode, the abnormality detection signal of each safety switch 200, and the abnormality detection result of the own switch. The master switch 200M outputs the display control signal to the slave switch 200S at a first front stage. The slave switch 200S at the first front stage acquires the display control signal from the master switch 200M and outputs the acquired display control signal to the adjacent safety switch 200 at the rear stage. The slave switches 200S other than the slave switch 200S at the first front stage may acquire the display control signal from the adjacent slave switch 200S at the front stage, and may output the acquired display control signal to the adjacent safety switch 200 at the rear stage.

The master switch 200M may generate the PLC control signal based upon the set system operation mode. The master switch 200M may also generate the PLC control signal based upon the set system operation mode, the acquired abnormality detection signal, and the abnormality detection result of the own switch. The master switch 200M outputs the PLC control signal to the safety PLC 400. The safety PLC 400 acquires the PLC control signal from the master switch 200M. The safety PLC 400 may instruct the control of the operation of the internal device based upon the PLC control signal.

According to the connection relationship illustrated in FIG. 17, the master switch 200M is not required to individually perform communication of the mode notification signal, the abnormality detection signal, and the display control signal with all the slave switches 200S. Specifically, each slave switch 200S may acquire the mode notification signal, the abnormality detection signal, and the display control signal from the adjacent slave switch 200S disposed at the front stage.

Figure 18:
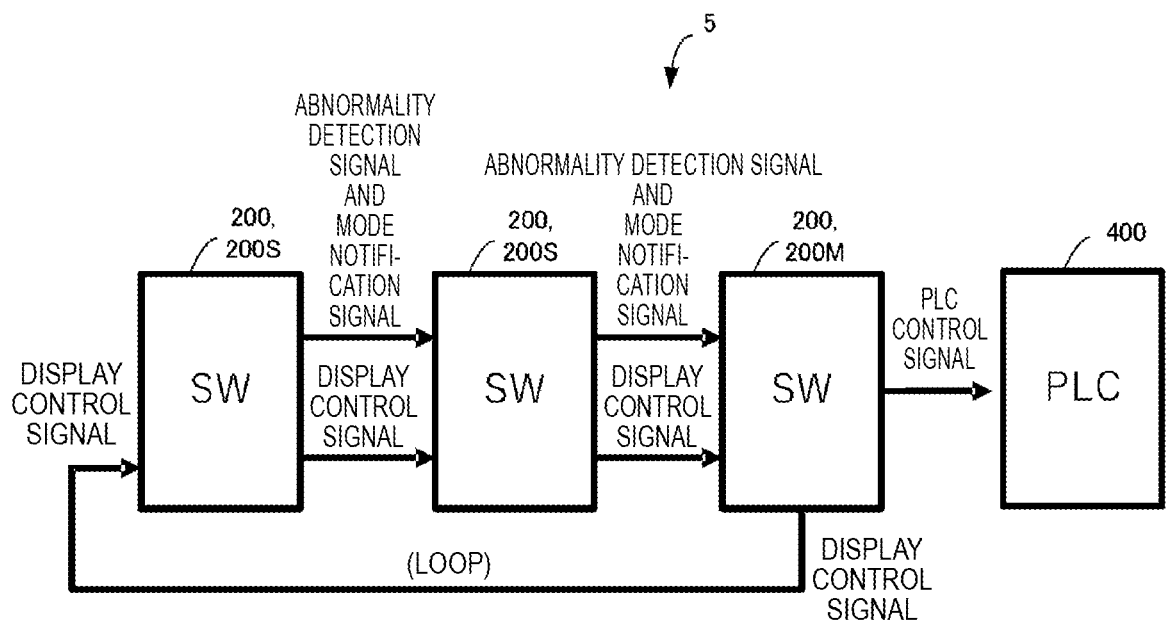
FIG. 18 is a diagram illustrating a first transmission example of a display control signal.

FIG. 18 is a diagram illustrating a first transmission example of the display control signal corresponding to one example of the connection relationship illustrated in FIG. 17 between the plurality of safety switches 200 and the safety PLC 400. In FIG. 18, the mode notification signal and the abnormality detection signal are transmitted in the same manner as that of FIG. 17. That is, the mode notification signal and the abnormality detection signal are transmitted in one direction to the safety switch 200 at the rear stage.

On the other hand, the display control signal is transmitted from the master switch 200M, which is a generation source, to the slave switch 200S at the first front stage, and continuously transmitted to the adjacent safety switch 200 at the rear stage in order. That is, the slave switch 200S at the first front stage acquires the display control signal from the master switch 200M, and outputs the acquired display control signal to the adjacent safety switch (the slave switch 200S or the master switch 200M) at the rear stage. Each slave switch 200S other than the slave switch 200S at the first front stage acquires the display control signal from the adjacent slave switch 200S at the front stage, and outputs the acquired display control signal to the adjacent safety switch 200 (the slave switch 200S or the master switch 200M) at the rear stage. Accordingly, a transmission path of the display control signal becomes a loop path as illustrated in FIG. 18.

The master switch 200M outputs the PLC control signal to the safety PLC 400 via the duplexed signal line (the OSSD1 and the OSSD2).

According to the transmission of the display control signal illustrated in FIG. 18, the master switch 200M may output the display control signal to the slave switch 200S at the first front stage. Therefore, it is possible to reduce a load on the master switch 200M when the master switch 200M instructs display control.

Figure 19:
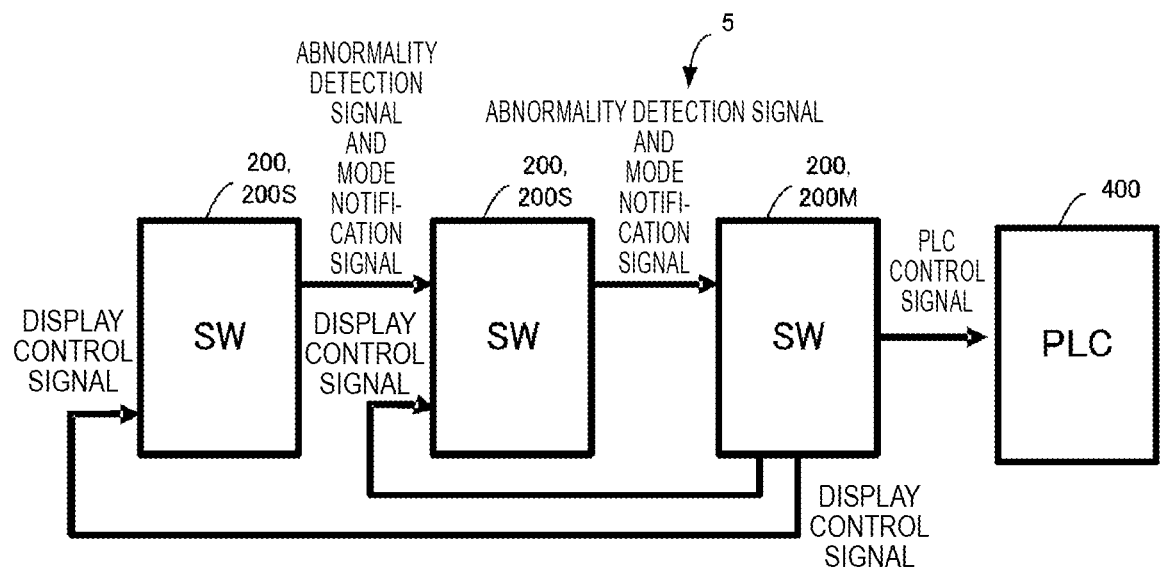
FIG. 19 is a diagram illustrating a second transmission example of the display control signal.

FIG. 19 is a diagram illustrating a second transmission example of the display control signal corresponding to one example of the connection relationship illustrated in FIG. 17 between the plurality of safety switches 200 and the safety PLC 400. In FIG. 19, the mode notification signal and the abnormality detection signal are transmitted in the same manner as that of FIG. 17. That is, the mode notification signal and the abnormality detection signal are transmitted in one direction to the safety switch 200 at the rear stage.

On the other hand, the display control signal is directly transmitted from the master switch 200M, which is the generation source, to each slave switch 200S. That is, the master switch 200M outputs the display control signal to each slave switch 200S. Each slave switch 200S acquires the display control signal from the master switch 200M. Accordingly, the transmission path of the display control signal does not become the loop path.

The master switch 200M outputs the PLC control signal to the safety PLC 400 via the duplexed signal line (the OSSD1 and the OSSD2).

According to the transmission of the display control signal illustrated in FIG. 19, the display control signal quickly reaches each slave switch 200S, such that real-time performance of the display of each slave switch 200S is improved.

While various embodiments are described above with reference to the drawings, it goes without saying that the present invention is not limited to such examples. It is apparent that a person skilled in the art can come up with various modifications or corrections within the scope of the claims, and it is understood that the modifications or corrections naturally belong to the technical scope of the present invention. Respective components in the embodiments may be selectively combined with each other within the scope not departing from the gist of the invention.

The embodiments show the specific display modes of the display modes DM1 to DM6 as an example, and other display modes may be used. For example, the display modes may be shown with another color, or may be shown with another lighting and flashing mode.

In the embodiment, the memory 218 of the safety switch 200 may store the ID of the RFID tag 280 of the maintenance actuator 250m and the ID of the RFID tag 280 of the normal actuator 250n in a distinguishable manner. Here, when the ID of the RFID tag 280 of one or more maintenance actuators 250m stored in the memory 218 includes the ID of the RFID tag 280 indicated in a notification from the actuator 250, the processor 211 may recognize that the maintenance actuator 250m is detected. Here, the processor 211 sets the switch operation mode to the maintenance mode. On the other hand, when the ID of the RFID tag 280 of one or more normal actuators 250n stored in the memory 218 does not include the ID of the RFID tag 280 indicated in a notification from the actuator 250, the processor 211 recognizes that the normal actuator 250n is detected. Here, the processor 211 sets the switch operation mode to the normal mode.

The embodiment shows an example in which the operation mode of the safety switch is set by using the maintenance actuator 250m, and the present invention is not limited thereto. For example, the safety switch 200 may include, for example, a mode changeover switch operated by an operator. Here, the mode changeover switch receives an operation for setting the operation mode (the maintenance mode or the normal mode) by the operator, and the processor 211 may set the operation mode of the safety switch based upon the above-described operation. The safety switch 200 may not be provided with the mode changeover switch, and one mode changeover switch may be provided in the switch system 5. Here, the mode changeover switch receives the operation for setting the operation mode by the operator, and the processor 211 may set the system operation mode based upon the operation.

In the embodiment, FIG. 17 shows an example of the connection relationship between the plurality of safety switches 200 and the safety PLC 400, but the present invention is not limited thereto. For example, the following modification can be considered.

Figure 20:
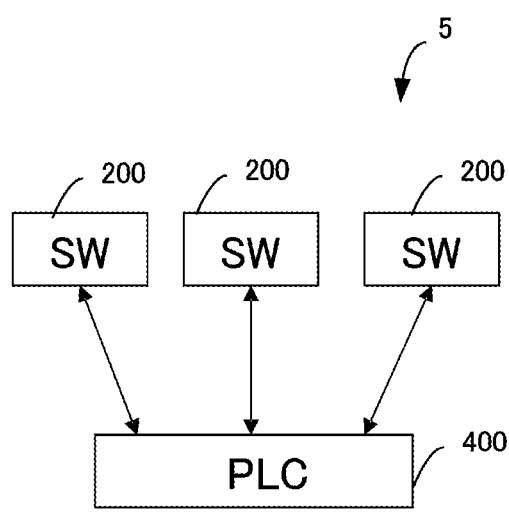
FIG. 20 is a diagram illustrating a first modification of the connection relationship between the plurality of safety switches and the safety PLC.

FIG. 20 is a diagram illustrating a first modification of the connection relationship between the plurality of safety switches 200 and the safety PLC 400. In FIG. 20, each safety switch 200 is connected to the safety PLC 400. In FIG. 20, the generation of the display control signal and the setting of the system operation mode are performed by the safety PLC 400. Each safety switch 200 is a safety switch located at a stage immediately before the safety PLC 400. In FIG. 20, since each of the plurality of safety switches 200 is not related to the front stage and the rear stage, the safety switch 200 may not be required to distinguish between the master switch and the slave switch.

In FIG. 20, the input/output unit 219 of each safety switch 200 outputs the mode notification signal and the abnormality detection signal to the safety PLC 400. The input/output unit 219 of the safety PLC 400 acquires the mode notification signal and the abnormality detection signal from each safety switch 200. The processor of the safety PLC 400 sets the system operation mode based upon the mode notification signal from each safety switch 200. The processor of the safety PLC 400 generates the display control signal based upon the system operation mode and the abnormality detection signal from each safety switch 200. The input/output unit 219 of the safety PLC 400 outputs the display control signal to each safety switch 200. The input/output unit 219 of each safety switch 200 acquires the display control signal from the safety PLC 400.

The safety PLC 400 may generate the PLC control signal based upon the set system operation mode. The safety PLC 400 may generate the PLC control signal based upon the set system operation mode and respectively acquired abnormality detection signals. The safety PLC 400 may instruct the control of the operation of the internal device based upon the PLC control signal.

According to the connection relationship therebetween illustrated in FIG. 20, the display control signal can be quickly reached from the safety PLC 400 to each safety switch 200, such that the real-time performance of the display of each safety switch 200 is improved.

Figure 21:
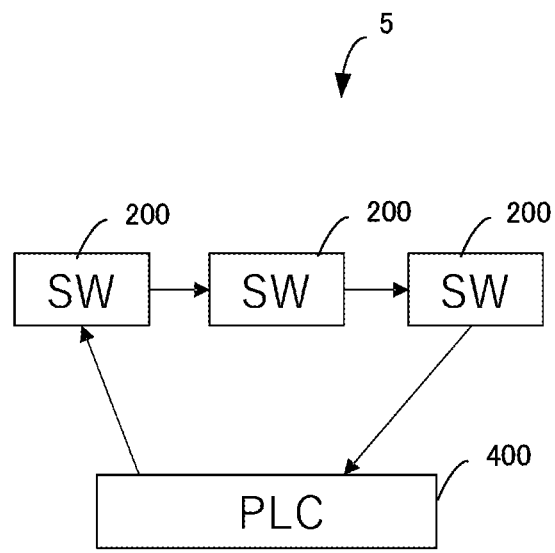
FIG. 21 is a diagram illustrating a second modification of the connection relationship between the plurality of safety switches and the safety PLC.

FIG. 21 is a diagram illustrating a second modification of the connection relationship between the plurality of safety switches 200 and the safety PLC 400. In FIG. 21, each safety switch 200 and the safety PLC 400 are circularly connected in series, that is, connected to loop. Here, the generation of the display control signal and the setting of the system operation mode are performed by the safety PLC 400. In FIG. 21, the safety switch 200 at the last rear stage becomes the master switch 200M, and other safety switches 200 become the slave switches 200S.

In FIG. 21, the input/output unit 219 of each safety switch 200 other than the safety switch at the last rear stage outputs the mode notification signal and the abnormality detection signal to the adjacent safety switch 200 at the rear stage or the safety PLC 400. The input/output unit 219 of the safety PLC 400 acquires the mode notification signal and the abnormality detection signal from the safety switch 200 at the last rear stage which is the master switch 200M. The processor of the safety PLC 400 sets the system operation mode based upon the acquired mode notification signal. The processor of the safety PLC 400 generates the display control signal based upon the mode notification signal and the abnormality detection signal from the safety switch 200 at the last rear stage. The input/output unit 219 of the safety PLC 400 outputs the display control signal to the safety switch 200 at the first front stage. The input/output unit 219 of the safety switch 200 at the first front stage acquires the display control signal from the safety PLC 400, and outputs the display control signal to adjacent another safety switch 200 at the rear stage. The input/output unit 219 of each safety switch 200 other than the safety switch 200 at the first front stage acquires the display control signal from the adjacent safety switch 200 at the front stage, and outputs the display control signal to adjacent another safety switch 200 at the rear stage.

The safety PLC 400 may generate the PLC control signal based upon the set system operation mode. The safety PLC 400 may also generate the PLC control signal based upon the set system operation mode and respectively acquired abnormality detection signals. The safety PLC 400 may instruct the control of the operation of the internal device based upon the PLC control signal.

According to the connection relationship therebetween illustrated in FIG. 21, the safety PLC 400 is not required to individually perform the communication of the mode notification signal, the abnormality detection signal, and the display control signal with all the safety switches 200. Specifically, the safety PLC 400 may acquire the mode notification signal and the abnormality detection signal from the safety switch 200 at the last rear stage, and may output the display control signal to the safety switch 200 at the first front stage. Therefore, it is possible to reduce a load on the safety PLC 400 when the safety PLC 400 instructs the di splay control.

In the embodiment, the maintenance mode is set by using the maintenance actuator 250*m*, but the present invention is not limited thereto. The processor 211 of the master switch 200M may set various modes by using an actuator for various uses. Here, the same procedures as those of the overall maintenance mode and the individual maintenance mode may be performed.

For example, the processor 211 of the master switch 200M may set a test mode by using a test actuator 250. For example, in the same manner as shown in the case using the maintenance actuator 250*m*, the master switch 200M stores identification information (for example, the ID of the RFID tag 280) of the test actuator 250 in the memory 218 of the sensor body 210 in advance. Then, when the sensor body 210 detects approach of the test actuator 250, the master switch 200M sets the system operation mode to the test mode.

The master switch 200M may output a display control signal indicating the test mode and sequentially transmit the display control signal to each slave switch 200S. As a result, the operator confirming the display of each safety switch 200 can recognize that the safety switch 200 of the switch system 5 or the internal device inside the device with the door 10 is under test for an operation or the like. The master switch 200M may output a PLC control signal indicating the test mode to the safety PLC. As a result, the safety PLC can allow the internal device to perform an operation specific to the test mode. As such, by using the test actuator 250, in order to set the test mode, it is not required to provide an external input signal line in the sensor body 210, and not required to input an external input signal (for example, a signal of 0 V) during the test.

For example, the processor 211 of the master switch 200M may permit release of an abnormality detection state (also referred to as unlocking) by using an unlocking actuator. That is, when at least one safety switch 200 in the switch system 5 detects the open state, the processor 211 of the master switch 200M detects presence of abnormality, outputs the display control signal indicating presence of the abnormality, and outputs the PLC control signal indicating presence of the abnormality to the safety PLC. Here, the processor 211 of the master switch 200M may be able to release the abnormality detection state only when the unlocking is permitted. That is, when all the safety switches 200 in the switch system 5 detect the closed state in a state where the unlocking is permitted, the master switch 200M detects presence of no abnormality, outputs the display control signal indicating presence of no abnormality, and outputs the PLC control signal indicating presence of no abnormality to the safety PLC.

When an unlocking actuator 250 is used, for example, in the same manner as shown in the case using the maintenance actuator 250*m*, the master switch 200M stores the identification information of the unlocking actuator 250 (for example, the ID of the RFID tag 280) in the memory 218 of the sensor body 210 in advance. Next, when the sensor body 210 detects approach of the unlocking actuator 250, the master switch 200M permits the unlocking.

By using unlocking actuator 250, in order to perform the unlocking, it is not required to provide an external input signal line in the sensor body 210, and not required to input an external input signal (for example, a signal of 0 V) during the unlocking. For example, even though the master switch 200M recognizes that the open state is detected by at least one safety switch 200 and then the closed state is detected by all the safety switches 200, as long as the unlocking is not performed, it is determined presence of no abnormality such that automatic recovery can be prevented.

In the embodiment, it is shown as an example that the device with the door 10 surrounds the internal device by the door 100, but the present invention is not limited thereto. For example, a locker (for example, a home delivery locker) may be disposed instead of the internal device. The door 100 may simply surround a predetermined space. That is, the device with the door 10 may simply partition the space.

In the embodiment, it is shown as an example that the safety switch 200 detects the open and closed state of the door 100 as the detection of the presence or absence of abnormality, but the present invention is not limited thereto. Abnormality other than the open and closed state of the door 100 may be detected.

In the embodiment, it is shown as an example that the sensor body 210 is installed on the back side of the door 100, but the present invention is not limited thereto. The sensor body 210 may be installed on the front side of the door 100. While it is shown as an example that the door body 113 is formed of the translucent member, the door body 113 may be formed of a non-translucent member.

In the embodiment, the processor may be physically configured in various ways. When a programmable processor is used, a processing content can be changed by changing a program, such that a degree of freedom in a processor design can be improved. The processor may be configured with one semiconductor chip, or may be physically configured with a plurality of semiconductor chips. When the processor is configured with a plurality of semiconductor chips, each control of the embodiment may be realized by a different semiconductor chip, respectively. Here, it can be considered that one processor is configured with those plurality of semiconductor chips. The processor may be configured with a member (a capacitor or the like) having a function different from that of the semiconductor chip. One semiconductor chip may be configured to realize the function of the processor and other functions. A plurality of processors may be configured with one processor.

As described above, the safety switch 200 of the embodiment includes: a setting unit (for example, the processor 211) configured to set the operation mode of the safety switch 200; an output unit (for example, the input/output unit 219) configured to output the mode notification signal for indicating whether the operation mode of the safety switch 200 is in the maintenance mode; an input unit (for example, the input/output unit 219) configured to receive an input of the display control signal based upon the system operation mode which is the operation mode of the switch system 5 including the safety switch 200 and at least one other safety switch 200; and a display unit (for example, the light source 213) configured to display an indication based upon the display control signal. In response to reception of the input of the display control signal which is based upon a fact that the system operation mode is in the system maintenance mode indicating that at least one of operation modes of the safety switch 200 and at least one other safety switch 200 is set to the maintenance mode, the display unit displays the indication indicating that the system operation mode is in the system maintenance mode.

As a result, the safety switch 200 is displayed based upon the display control signal that reflects whether the operation mode is in the maintenance mode, thereby making it possible to represent that the operation mode is set to the system maintenance mode. Accordingly, the operator can recognize whether maintenance is in progress by confirming the display on the display unit. Even though another switch (another safety switch 200) is set to the maintenance mode instead of the own switch (the safety switch 200), the entire system switches to the system maintenance mode. Therefore, the safety switch 200 can improve the safety of the operator during the maintenance inside the door 100 on which the safety switch 200 is mounted.

The safety switch 200 may further include a first detection unit (for example, the coil 212) for detecting the presence or absence of abnormality. The display unit may display the indication based upon the display control signal and the detection result of the presence or absence of abnormality detected by the first detection unit.

As a result, the safety switch 200 can display the display control signal as well as the detection result of the presence or absence of abnormality of the own switch. For example, when the system operation mode is in the overall maintenance mode (an example of the system maintenance mode) and the own switch detects presence of no abnormality, the safety switch 200 can display the indication indicating that the overall maintenance mode is being set, and when the own switch detects the presence of abnormality, the safety switch 200 can display the indication indicating presence of abnormality. Therefore, the operator can recognize that maintenance is in progress, and can recognize a dangerous state.

The output unit may output the abnormality detection signal indicating the detection result of the presence or absence of abnormality. The input unit may receive the input of the display control signal based upon the detection result of abnormality by each of the safety switch and the at least one other safety switch.

As a result, the safety switch 200 can display the indication in consideration of the detection result of the presence or absence of abnormality of the own switch as well as the display control signal based upon the setting of the system maintenance mode and the detection result of the presence or absence of abnormality by each safety switch 200. Therefore, for example, when the system operation mode is in the individual maintenance mode (an example of the system maintenance mode), the own switch detects presence of no abnormality, and another safety switch detects presence of abnormality, the safety switch 200 can display the above-described states. Therefore, by confirming the display, the operator can recognize that the maintenance is in progress, the own switch does not detect danger, and another switch detects the danger.

The input unit may be configured to receive the input of the display control signal based upon a fact that a predetermined time or more has elapsed since the system operation mode was set to the system maintenance mode. The display unit may display the indication indicating that the predetermined time or more has elapsed since the system operation mode was set to the system maintenance mode.

As a result, the safety switch 200 can display that setting of the system maintenance mode is terminated due to the elapsed time being exceeded. Accordingly, the operator can recognize that a maintenance period is over such that there is a possibility of danger occurrence.

The safety switch 200 may further include the sensor body 210. The sensor body 210 may include the setting unit, the output unit, the input unit, the display unit, a second detection unit (for example, the coil 212) configured to detect the identification information of the actuator 250, and a storage unit (for example, the memory 218) that stores a first identification information. In a case where a second identification information (for example, the ID of the RFID tag 280) stored in the actuator 250 detected by the second detection unit matches the first identification information, the setting unit of the sensor body 210 may set the operation mode of the safety switch 200 to the maintenance mode.

As a result, the operator simply allows the specific actuator 250 (for example, the maintenance actuator 250*m*) to move closer to the sensor body 210, thereby making it possible to easily switch the operation mode of the safety switch 200 without performing an operation or the like of a special switch.

The safety switch 200 may be installed on the door 100. The first detection unit may detect the open or closed state of the door 100.

As a result, the safety switch 200 can perform the display based upon the open and closed state of the own door on which the own switch is installed.

The switch system 5 of the embodiment includes the plurality of safety switches 200. The plurality of safety switches 200 may include a first safety switch (for example, the master switch 200M) and a second safety switch (for example, the slave switch 200S). An output unit of the second safety switch may output a mode notification signal to the first safety switch. The first safety switch may set a system operation mode based upon an operation mode set by a setting unit of the first safety switch and the mode notification signal, and may output a display control signal based upon the system operation mode to the second safety switch.

As a result, the first safety switch can set the system operation mode based upon the operation mode set by each safety switch 200. Next, when the system operation mode is set to, for example, a system maintenance mode, the second safety switch can input the display control signal based upon the fact that the system operation mode is in the system maintenance mode. Accordingly, each safety switch 200 can display that the system operation mode is in the system maintenance mode by being displayed based upon the display control signal. Accordingly, any operator who confirms the display of any safety switch 200 can also recognize that maintenance is in progress. Therefore, the switch system 5 can improve the safety of the operator during maintenance inside the door 100 on which the safety switch 200 is mounted.

In a case where the system operation mode is set to the system maintenance mode, the output unit of the second safety switch may output a control signal (for example, the PLC control signal) based upon the fact that the system operation mode is in the system maintenance mode to a control device (for example, the safety PLC) configured to control an operation of a device to be maintained (for example, the internal device).

As a result, the switch system 5 can allow the device to be maintained to perform a specific operation when the system maintenance mode is being set, which is different from the operation based upon the detection result of the presence or absence of the abnormality by each safety switch 200.

In a case where the system operation mode is set to the system maintenance mode, and at least one of the safety switches 200 provided in the switch system 5 detects the presence of abnormality, the output unit of the second safety switch may output the control signal based upon the detection of the presence of abnormality to the control device.

As a result, even though the system operation mode is set to the system maintenance mode, the switch system 5 can allow the device to be maintained to perform the operation corresponding to the presence of abnormality when any one of the safety switches 200 detects the presence of abnormality.

The system maintenance mode that can be set as the system operation mode may include a plurality of types of system maintenance modes. The output unit of the second safety switch may output a control signal which is different depending upon the type of system maintenance mode.

As a result, the control device can perform a different operation depending on the type of system maintenance mode by acquiring the different control signal. For example, the different operation can be appropriately set in the control device.

The output unit of the first safety switch may output the control signal via a duplexed signal line. The output unit of the second safety switch may output the mode notification signal via a single signal line.

As a result, the switch system 5 can maintain the safety output performance by the master switch 200M while simplifying the configuration of the slave switch 200S. For example, when the system operation mode is in the system normal mode, the same signal (for example, the ON signal and the ON signal, or the OFF signal and the OFF signal) is transmitted via the duplexed signal line (for example, the OSSD1 and the OSSD2), such that the detection result of the presence or absence of abnormality can be obtained. When the system operation mode is in the system maintenance mode, a different signal (for example, the ON signal and the OFF signal, or the OFF signal and the ON signal) is transmitted via the duplexed signal line, such that the control device can be notified that the system operation mode is in the system maintenance mode. Accordingly, the switch system 5 can allow the device to be maintained to perform the operation specific to the maintenance mode.

The plurality of safety switches 200 may be circularly connected in series.

As a result, the plurality of safety switches 200 are connected to loop. Accordingly, the first safety switch is not required to communicate with each of the second safety switches. For example, the first safety switch may output a display control signal to the second safety switch at a first front stage, and then the display control signal may be input to the second safety switch at a last rear stage. Accordingly, the switch system 5 can reduce an input and output load of the master switch 200M.

The present disclosure is useful for a safety switch and a switch system capable of improving the safety of an operator during maintenance inside a door on which the safety switch is mounted.

The invention claimed is:

1. A safety switch comprising:
   a setting unit configured to set an operation mode of the safety switch;
   an output unit configured to output a mode notification signal for indicating whether the operation mode of the safety switch is in a maintenance mode;
   an input unit configured to receive an input of a display control signal based upon a system operation mode which is an operation mode of a switch system comprising the safety switch and at least one other safety switch; and
   a display unit configured to display an indication based upon the display control signal,
   wherein the at least one other safety switch includes at least one respective display unit,
   wherein in response to reception of the input of the display control signal which is based upon a fact that the system operation mode is in a system maintenance mode indicating that at least one of operation modes of the safety switch and the at least one other safety switch is set to the maintenance mode, the display unit and the at least one respective display unit are configured to display the indication indicating that the system operation mode is in the system maintenance mode.

2. The safety switch according to claim 1, further comprising:
   a first detection unit configured to detect presence or absence of abnormality,
   wherein the display unit displays the indication based upon the display control signal and a detection result of the presence or absence of the abnormality detected by the first detection unit.

3. The safety switch according to claim 2,
   wherein the output unit outputs an abnormality detection signal indicating the detection result of the presence or absence of the abnormality, and
   wherein the input unit receives the input of the display control signal based upon an abnormality detection result by each of the safety switch and the at least one other safety switch.

4. The safety switch according to claim 2,
   wherein the safety switch is installed on a door, and
   wherein the first detection unit detects an open or closed state of the door.

5. The safety switch according to claim 1,
   wherein the input unit is configured to receive the input of the display control signal based upon a lapse of a predetermined time or more after the system operation mode is set to the system maintenance mode, and
   wherein the display unit displays the indication indicating that the predetermined time or more has elapsed since the system operation mode was set to the system maintenance mode.

6. The safety switch according to claim 1, further comprising:
   a sensor body,
   wherein the sensor body comprises the setting unit, the output unit, the input unit, the display unit, a second detection unit configured to detect identification information of an actuator, and a storage unit that stores first identification information, and
   wherein in a case where second identification information stored in the actuator detected by the second detection unit matches the first identification information, the setting unit of the sensor body sets the operation mode of the safety switch to the maintenance mode.

7. A switch system comprising a plurality of safety switches comprising a first safety switch and a second safety switch,
   wherein each safety switch of the plurality of the safety switches comprises:
   a setting unit configured to set an operation mode of each safety switch of the plurality of the safety switches;
   an output unit configured to output a mode notification signal for indicating whether the operation mode of each safety switch of the plurality of the safety switches is in a maintenance mode;
   an input unit configured to receive an input of a display control signal based upon a system operation mode which is an operation mode of the switch system; and
   a display unit configured to display an indication based upon the display control signal,
   wherein in response to reception of the input of the display control signal which is based upon a fact that the system operation mode is in a system maintenance mode indicating that at least one of operation modes of each safety switch of the plurality of the safety switches and at least one other safety switch out of the plurality of safety switches is set to the maintenance mode, the display unit displays the indication indicating that the system operation mode is in the system maintenance mode,
   wherein an output unit of the second safety switch is configured to output the mode notification signal to the first safety switch, and
   wherein the first safety switch is configured to set the system operation mode based upon the operation mode set by the setting unit of the first safety switch and the mode notification signal from the second safety switch, and output the display control signal based upon the system operation mode to the second safety switch.

8. The switch system according to claim 7,
   wherein in a case where the system operation mode is set to the system maintenance mode, an output unit of the first safety switch outputs a control signal based upon the setting of the system maintenance mode to a control device configured to control an operation of a device to be maintained.

9. The switch system according to claim 8,
   wherein the system maintenance mode that is allowed to be set as the system operation mode comprises a plurality of types of system maintenance modes, and
   wherein the output unit of the first safety switch outputs the control signal which is different depending upon the types of system maintenance modes.

10. The switch system according to claim 8,
wherein the output unit of the first safety switch outputs the control signal to the control device via a duplexed signal line, and
wherein the output unit of the second safety switch outputs the mode notification signal to the first safety switch via a single signal line.

11. The switch system according to claim 7,
wherein the plurality of safety switches are circularly connected in series.

12. A switch system comprising a plurality of safety switches comprising a first safety switch and a second safety switch,
wherein each safety switch of the plurality of the safety switches comprises:
   a setting unit configured to set an operation mode of each safety switch of the plurality of the safety switches;
   an output unit configured to output a mode notification signal for indicating whether the operation mode of each safety switch of the plurality of the safety switches is in a maintenance mode;
   an input unit configured to receive an input of a display control signal based upon a system operation mode which is an operation mode of the switch system; and
   a display unit configured to display an indication based upon the display control signal,
wherein in response to reception of the input of the display control signal which is based upon a fact that the system operation mode is in a system maintenance mode indicating that at least one of operation modes of each safety switch of the plurality of the safety switches and at least one other safety switch out of the plurality of safety switches is set to the maintenance mode, the display unit displays the indication indicating that the system operation mode is in the system maintenance mode,
wherein an output unit of the second safety switch is configured to output the mode notification signal to the first safety switch, and
wherein the first safety switch is configured to set the system operation mode based upon the operation mode set by the setting unit of the first safety switch and the mode notification signal from the second safety switch, and output the display control signal based upon the system operation mode to the second safety switch,
wherein in a case where the system operation mode is set to the system maintenance mode, an output unit of the first safety switch outputs a control signal based upon the setting of the system maintenance mode to a control device configured to control an operation of a device to be maintained,
wherein in a case where the system operation mode is set to the system maintenance mode and at least one of the plurality of safety switches provided in the switch system detects presence of abnormality, the output unit of the first safety switch outputs the control signal based upon detection of the presence of the abnormality to the control device.

\* \* \* \* \*